(12) United States Patent
Glaser et al.

(10) Patent No.: US 10,857,754 B2
(45) Date of Patent: Dec. 8, 2020

(54) PEELABLE PACKAGE

(71) Applicant: Bemis Company, Inc., Neenah, WI (US)

(72) Inventors: Kevin D. Glaser, Appleton, WI (US); Sam E. Wuest, Oshkosh, WI (US)

(73) Assignee: Bemis Company, Inc., Neenah, WI (US)

( * ) Notice: Subject to any disclaimer, the term of this patent is extended or adjusted under 35 U.S.C. 154(b) by 0 days.

(21) Appl. No.: 16/562,019

(22) Filed: Sep. 5, 2019

(65) Prior Publication Data

US 2020/0039174 A1 Feb. 6, 2020

Related U.S. Application Data

(63) Continuation of application No. 15/309,618, filed as application No. PCT/US2014/039355 on May 23, 2014, now abandoned.

(51) Int. Cl.
*B65D 75/58* (2006.01)
*B65D 81/34* (2006.01)
(Continued)

(52) U.S. Cl.
CPC .............. *B32B 1/02* (2013.01); *B32B 1/08* (2013.01); *B32B 7/05* (2019.01); *B32B 7/06* (2013.01);
(Continued)

(58) Field of Classification Search
CPC .......... B65D 1/34; B65D 65/38; B65D 65/40; B65D 75/008; B65D 75/5855;
(Continued)

(56) References Cited

U.S. PATENT DOCUMENTS 4,111,349 A 9/1978 Buckler et al.
4,189,519 A 2/1980 Ticknor
(Continued)

FOREIGN PATENT DOCUMENTS

EP 0213698 A2 3/1987
EP 0300104 A1 1/1989
(Continued)

*Primary Examiner* — Walter Aughenbaugh
(74) *Attorney, Agent, or Firm* — Lynn M. Nett

(57) ABSTRACT

A peelable package is described. The package comprises a first sealant layer comprising low density polyethylene and a first contaminant and a second sealant layer comprising polyethylene polymer, such as high-density polyethylene, low density polyethylene, ethylene alpha-olefin copolymer or blends of such, and a second contaminant. The first contaminant and the second contaminant are selected from the group consisting propylene/ethylene copolymer with ethylene content from about 0.1 mol % to about 5 mol %, polypropylene homopolymer, butene/ethylene copolymer and polybutene homopolymer. The first contaminant of the first sealant layer may be the same as or different than the second contaminant of the second sealant layer. Also described are various embodiments of the first sealant layer, the second sealant layer and the peelable seal that is formed between the first sealant layer and the second sealant layer.

19 Claims, 10 Drawing Sheets

(51) Int. Cl.
*B32B 1/02* (2006.01)
*B32B 27/32* (2006.01)
*B32B 7/05* (2019.01)
*B65D 65/40* (2006.01)
*B65D 65/38* (2006.01)
*B65D 75/00* (2006.01)
*B32B 1/08* (2006.01)
*C08L 23/06* (2006.01)
*B32B 7/06* (2019.01)
*B32B 27/08* (2006.01)
*B65D 1/34* (2006.01)

(52) U.S. Cl.
CPC .............. *B32B 27/08* (2013.01); *B32B 27/32* (2013.01); *B32B 27/327* (2013.01); *B65D 1/34* (2013.01); *B65D 65/38* (2013.01); *B65D 65/40* (2013.01); *B65D 75/008* (2013.01); *B65D 75/5855* (2013.01); *B65D 81/3453* (2013.01); *B65D 81/3461* (2013.01); *C08L 23/06* (2013.01); *B32B 2250/02* (2013.01); *B32B 2250/24* (2013.01); *B32B 2250/242* (2013.01); *B32B 2270/00* (2013.01); *B32B 2307/31* (2013.01); *B32B 2307/748* (2013.01); *B32B 2435/02* (2013.01); *B32B 2439/00* (2013.01); *B32B 2439/40* (2013.01); *B32B 2553/00* (2013.01); *C08L 2203/162* (2013.01)

(58) Field of Classification Search
CPC .. B65D 81/3453; B65D 81/3461; B32B 1/02; B32B 1/08; B32B 27/32; B32B 27/327
See application file for complete search history.

(56) References Cited

U.S. PATENT DOCUMENTS

| | | |
|---|---|---|
| 4,665,130 A | 5/1987 | Hwo |
| 4,784,885 A | 11/1988 | Carespodi |
| 4,810,541 A | 3/1989 | Newman et al. |
| 4,882,229 A | 11/1989 | Hwo |
| 4,944,409 A | 7/1990 | Busche et al. |
| 5,023,121 A | 6/1991 | Pockat et al. |
| 5,128,414 A | 7/1992 | Hwo |
| 5,221,566 A | 6/1993 | Tokoh et al. |
| 5,392,986 A | 2/1995 | Beer et al. |
| 5,407,751 A | 4/1995 | Genske et al. |
| 6,221,410 B1 | 4/2001 | Ramesh et al. |
| RE37,171 E | 5/2001 | Busche et al. |
| 6,861,478 B2 | 3/2005 | Yasaka |
| 6,887,540 B2 | 5/2005 | Inoue |
| 7,527,839 B2 | 5/2009 | Busche et al. |
| 7,641,814 B2 | 1/2010 | Lynch et al. |
| 7,845,147 B2 | 12/2010 | Henderson et al. |
| 8,206,798 B2 | 6/2012 | Shibata et al. |
| 2002/0197425 A1 | 12/2002 | Wolf et al. |
| 2004/0048086 A1* | 3/2004 | Kennedy ................. B32B 27/08 428/517 |
| 2005/0266257 A1 | 12/2005 | Lee et al. |
| 2006/0014036 A1 | 1/2006 | Kendig et al. |
| 2008/0063821 A1* | 3/2008 | Galloway ................. B32B 7/06 428/35.2 |
| 2010/0092793 A1 | 4/2010 | Aithani et al. |
| 2011/0104342 A1 | 5/2011 | Glaser et al. |

FOREIGN PATENT DOCUMENTS

| | | |
|---|---|---|
| EP | 0435789 A2 | 7/1991 |
| EP | 0785066 A2 | 7/1997 |
| WO | 9952972 A1 | 10/1999 |

\* cited by examiner

110 →

| 111a |
| 111b |
| 111c |
| 111d |
| 111e |
| 111f |
| 119 |

| 122a |
| 122b |
| 122c |
| 122d |
| 122e |
| 129 |

FIG. 12

PEELABLE PACKAGE

CROSS-REFERENCE TO RELATED APPLICATIONS

This present application is a continuation of U.S. patent application Ser. No. 15/309,618 filed Nov. 8, 2016, which is a national stage filing of Application PCT/US14/39355 filed May 23, 2014. The noted related applications are incorporated in their entirety in this present application by this reference.

BACKGROUND OF THE INVENTION

This present application relates to a peelable package that maintains seal integrity when exposed to pressure differentials. Such package includes a first sealant layer and a second sealant layer.

The known art includes peelable packages with seals that have certain seal strengths to allow packages to be peeled open. For example, U.S. Pat. No. 4,882,229 (published Nov. 21, 1989) discloses improving peel seal characteristics of wrapping films or sheet by fabricating films or sheets from blends of high molecular weight butene-1 homopolymers or copolymers and low density polyethylene (either modified or non-modified). Such films or sheets are designed to bond to polypropylene without the aid of an adhesive and to bond to other substrates using a tie layer adhesive. These films or sheets are reported to have a clean sealing surface with few angel hairs. However, these films or sheets do not ensure seal integrity when exposed to pressure differentials.

U.S. Pat. No. 6,861,478 (published Mar. 1, 2005) discloses an easy peel feature created by a sealant resin composition comprising 60 to 95 weight percent ethylene polymer and 5 to 40 weight percent 1-butene polymer, such that a melt flow rate ratio between the two polymers is not less than 1. A resulting laminated film is reported to have an easy peel feature, such that it is readily separated from sealed surfaces after heat sealing and does not develop any phenomenon of resin threading from the sealed surfaces when they are separated. This composition is reported to "adhere tightly" to other plastic film by heat sealing. Again, however, this laminated film does not ensure seal integrity when exposed to pressure differentials.

What is needed is a peelable package with an easily-opened seal having seal integrity when exposed to pressure differentials, including but not limited to in the presence or absence of package contents accumulated on a sealant layer.

BRIEF SUMMARY OF THE INVENTION

This need is met by the peelable package described in the present application. In a first embodiment, this package comprises a first sealant layer and a second sealant layer.

The first sealant layer comprises low density polyethylene and a first contaminant. In some embodiments, the low density polyethylene may have a melt index of 0.6 g/10 min to about 20 g/10 min (at 190° C./2.16 kg). The first contaminant is one of the following: propylene/ethylene copolymer with ethylene content from about 0.1 mol % to about 5 mol %, polypropylene homopolymer, butene/ethylene copolymer or polybutene homopolymer. The low density polyethylene is present in an amount from about 70% to about 95% by weight of the first sealant layer. The first contaminant is present in an amount from about 5% to about 30% or, in some embodiments from about 10% to about 25%, by weight of the first sealant layer. In some embodiments, the first sealant layer may have a thickness from about 1 mil to about 5 mil.

The second sealant layer comprises polyethylene polymer, such as high density polyethylene, low density polyethylene, ethylene alpha-olefin copolymer or blends of such, and a second contaminant. The second contaminant is one of the following: propylene/ethylene copolymer with ethylene content from about 0.1 mol % to about 5 mol %, polypropylene homopolymer, butene/ethylene copolymer or polybutene homopolymer. The first contaminant of the first sealant layer may be the same as or different than the second contaminant of the second sealant layer. The polyethylene polymer is present in an amount from about 70% to about 90% by weight of the second sealant layer. In some embodiments, the polyethylene polymer may comprise high density polyethylene. In further embodiments, the high density polyethylene may comprise a blend of two different high density polyethylene: a first high density polyethylene and a second high density polyethylene. In some embodiments, the polyethylene polymer may comprise a blend of high density polyethylene and low density polyethylene. In some embodiments, the polyethylene polymer may comprise low density polyethylene. In further embodiments, the polyethylene polymer may comprise a blend of low density polyethylene and ethylene alpha-olefin copolymer. The second contaminant is present in an amount from about 10% to about 30% or, in some embodiments from about 15% to about 25%, by weight of the second sealant layer. In some embodiments, the package may comprise a first film and a second film. In such embodiments, the first film comprises the first sealant layer and the second film comprises the second sealant layer. Additionally, in some embodiments, the first film may be a sheet thermoformed into a cup and the second film may be a film slit into a lidding film. In some embodiments, the package may be an aseptic package.

In some embodiments, the first sealant layer and the second sealant layer of the package are adapted to be sealed together to form a peelable seal. In some embodiments, they may be sealed together at (1) a sealing temperature from about 210° C. to about 225° C. and a sealing pressure of from about 43 psi to about 87 psi or (2) at a sealing temperature from about 120° C. to about 130° C. and a sealing pressure about 50 psi or (3) at a sealing temperature from about 220° C. to about 230° C. and a sealing pressure from about 20 psi to about 25 psi. In some embodiments, this peelable seal may be a contour seal. In some embodiments, this peelable seal may have a burst strength greater than about 7.4 psi or, in some embodiments between about 10 psi and 50 psi, in accordance with ASTM F2054 and may have an initial opening force of less than about 2,500 g/inch or, in some embodiments between about 0 g/inch and 2,000 g/inch, in accordance with ASTM F88 or with ASTM F88 as modified for a 45-degree tray peel test.

In a second embodiment, the package described in the present application is an aseptic package that comprises a first film comprising a first sealant layer and a second film comprising a second sealant layer. In some embodiments, the first film may be a sheet thermoformed into a cup and the second film may be a film slit into a lidding film. The first sealant layer comprises low density polyethylene and a random butene-1/ethylene copolymer. In some embodiments, the low density polyethylene may have a melt index of 0.6 g/10 min to about 20 g/10 min (at 190° C./2.16 kg). The low density polyethylene is present in an amount from about 75% to about 90% by weight of the first sealant layer, and the random butene-1/ethylene copolymer is present in an amount from about 10% to about 25% by weight of the first sealant layer. In some embodiments, the first sealant layer may have a thickness from about 1 mil to about 5 mil.

The second sealant layer comprises a first high density polyethylene, a second high density polyethylene and polybutene homopolymer. The first high density polyethylene is present is an amount from about 50% to about 65% by weight of the second sealant layer, the second high density polyethylene is present in an amount from about 15% to about 25% by weight of the second sealant layer and the polybutene homopolymer is present in an amount from about 15% to about 25% by weigh of the second sealant layer.

In some embodiments of this second embodiment, the first sealant layer and the second sealant layer of the package are adapted to be sealed together to form a peelable seal. In some embodiments, this peelable seal may be a contour seal. In some embodiments, this peelable seal may have a burst strength between about 10 psi and 50 psi in accordance with ASTM F2054 and may have an initial opening force between about 0 g/inch and 2,000 g/inch in accordance with ASTM F88 or with ASTM F88 as modified for a 45-degree tray peel test.

Additional embodiments, features and advantages of the present application are described in and will be apparent from the detailed description and the drawings.

BRIEF DESCRIPTION OF THE DRAWINGS

FIG. 11 is a cross-sectional view of a first embodiment of a second film comprising a second sealant layer according to the present application.

FIG. 12 is a cross-sectional view of a second embodiment of a second film comprising a second sealant layer according to the present application.

DETAILED DESCRIPTION OF THE INVENTION

Figure 1:
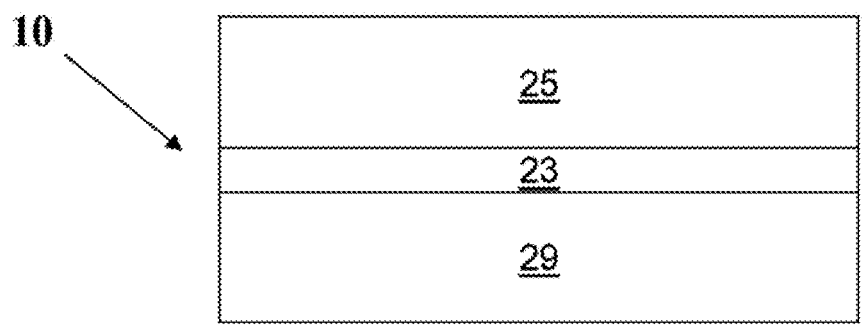
FIG. 1 is a cross-sectional view of a first embodiment of a package according to the present application.

As used throughout this application, the term "sheet" refers to a plastic web of any thickness and is not limited to a plastic web having a thickness of greater than about 10 mil. The term "film" means a plastic web of any thickness and is not limited to a plastic web having a thickness of less than about 10 mil. For convenience, this application may refer to a sheet having a thickness greater than or including a film; but the terms are not limited to such interpretation.

As used throughout this application, the term "about" refers to approximately, rounded up or down to, reasonably close to, in the vicinity of, or the like. The term "approximate" is synonymous with the term "about."

As used throughout this application, the term "thermoplastic" refers to a polymer or polymer mixture that softens when exposed to heat and then returns to its original condition when cooled to room temperature. In general, thermoplastic materials may include natural or synthetic polymers. Thermoplastic materials may further include any polymer that is cross-linked by either radiation or chemical reaction during manufacturing or post-manufacturing processes.

As used throughout this application, the term "package" refers to any device used to wholly or partially surround an item. A package may take many, various forms. For example, the term "package" may include pouches that wholly surround an item (or items) to be packaged; the term "package" may also include films, sheets, etc. that partially surround an item (or items) to be packaged and, when used in conjunction with another film, sheet, etc. wholly surround an item (or items). In various embodiments of the present application, one of the film, sheet, etc. may be thermoformed into a cup, tray, plate or other container.

As used throughout this application, the term "aseptic package" refers to a package in which the packaged product (such as cheese, sauces, gravies, pudding, infant formula, milk-base products, etc.) and its packaging component(s) are sterilized separately and then combined in a sterilize environment to form a shelf-stable package.

As used throughout this application, the term "layer" refers to a discrete film or sheet component which may or may not be coextensive with the film or sheet but has a substantially uniform composition. In referring to a monolayer film, "film," "sheet" and "layer" are synonymous. As used throughout this application, the term "multilayer" refers to a plurality of layers in a single structure generally in the form of a film or sheet which may be made from a polymeric material or a non-polymeric material bonded together by any conventional means known in the art (i.e., coextrusion, lamination, coating or blends of such).

As used throughout this application, the term "exterior layer" refers to a layer comprising the outermost surface of a film, sheet or other article relative to the contents of the filled package (i.e., the layer of the film, sheet or other article farthest from the contents of the filled package). The term "interior layer" refers to a layer comprising the innermost surface of a film, sheet or other article relative to the contents of the filled package (i.e., the layer of the film, sheet or other article, closet to the contents of the filled package). Additionally, the exterior layer and the interior layer each have an inner surface and an outer surface. The term "inner surface"

refers to a surface touching another layer, and the term "outer surface" refers to a surface not touching another layer.

As used throughout this application, the term "thermoformed" refers to polymer film or sheet formed into a desired shape by the application of a differential pressure between the film or sheet and a mold, by the application of heat, by the combination of heat and the application of a differential pressure between the film or sheet and a mold, or by any thermoforming technique known to those skilled in the art.

As used throughout this application, the term "blown film" refers to a film produced by the blown coextrusion process. In the blown coextrusion process, streams of melt-plastified polymers are forced through an annular die having a central mandrel to form a tubular extrudate. The tubular extrudate may be expanded to a desired wall thickness by a volume of fluid (e.g., air or other gas) entering the hollow interior of the extrudate via the mandrel, and then rapidly cooled or quenched by any of various methods known to those of skill in the art.

As used throughout this application, the term "copolymer" refers to a polymer product obtained by the polymerization reaction or copolymerization of at least two monomer species. Copolymers may also be referred to as bipolymers. The term "copolymer" is also inclusive of the polymerization reaction of three, four or more monomer species having reaction products referred to terpolymers, quaterpolymers, etc.

As used throughout this application, the term "sealant layer" refers to a layer a film, sheet, etc. involved in the sealing of the film, sheet, etc. to itself and/or to another layer of the same or another film, sheet, etc.

The present application describes two sealant layers sealed together to form a peelable seal. As used throughout this application, "peelable seal" refers to the seal or joint between two thermoplastic films produced by heat sealing or impulse sealing or otherwise. The seal or joint formed is able to be opened in the original plane of sealing or joining of the two films by the action of a pulling force, without wrenching off or tearing or shredding occurring in the material of the two films used to comprise the seal or joint. For various embodiments of the present application, the peelable seal possesses a mechanical resistance sufficient to maintain the wholeness and the tight-seal properties of the package during storage and transport until such time as the package is opened by the user of the article. The mechanical resistance of the peelable seal is low enough to permit ready manual opening of the seal or joint, i.e., without the use of any auxiliary instrument. In various embodiments present application, mechanical resistance and tight-seal properties are measured by burst strength (in psi) in accordance with ASTM F2054 and peelability is measured by initial opening force (in g/inch) and propagation opening force (in g/inch) in accordance with ASTM F88 and in accordance with ASTM F88 as modified for the 45-degree tray peel test (as further described below).

As used throughout this application, the term "polybutene" or "polybutylene" refers to any of several thermoplastic isotactic (stereo regular) polymers of isobutene. Such polymers may be polybutene homopolymers or copolymers with low, medium or high ethylene content. Polybutene useful in various embodiments of the present application may have a melt index (or melt flow rate) of from about 0.1 g/10 min to about 40 g/10 min (at 190° C./2.16 kg) and a density of from about 0.897 g/cm$^a$ to about 0.925 g/cm$^3$. Non-limiting examples of polybutene useful in various embodiments of the present application include polybutene homopolymers and butene/ethylene copolymers. Non-limiting specific examples of polybutene useful in various embodiments of the present application include Polybutene-1 PB 0110M, a semi-crystalline homopolymer having a reported melt flow rate of 0.4 g/10 min (at 190° C./2.16 kg) and a reported density of 0.914 g/cm$^3$, and Polybutene-1 PB 8640M, a random copolymer of butene-1 with low ethylene content, having a reported melt flow rate of 1 g/10 min (at 190° C./2.16 kg) and a reported density of 0.906 g/cm$^3$, each available from LyondellBasell Industries (Houston, Tex.).

As used throughout this application, the term "polypropylene" or "PP" refers to a homopolymer or copolymer having at least one propylene monomer linkage within the repeating backbone of the polymer. The propylene linkage can be represented by the general formula: $[CH_2—CH(CH_3)]_n$. Non-limiting examples of polypropylenes useful in various embodiments of the present application include polypropylene homopolymers and propylene/ethylene copolymers with low ethylene content, for example, from about 0.1 mol % to about 5 mol % or from about 2 mol % to about 3 mol %. A specific non-limiting example of a propylene homopolymer useful in various embodiments of the present application includes Polypropylene Lumicene® M3382MZ, having a reported melt flow of 3.5 g/10 min (at 230° C./2.16 kg), available from Total Petrochemicals & Refining USA, Inc. (Houston, Tex.). Non-limiting examples of propylene/ethylene copolymers useful in various embodiments of the present application include random, block or impact copolymers. A specific non-limiting example of a propylene/ethylene copolymer useful in various embodiments of the present application includes Pro-Fax® SA861, a random copolymer having a reported melt flow rate of 6.5 g/10 min (at 230° C./2.16 kg) and a reported density/specific gravity of 0.90, available from LyondellBasell Industries (Houston, Tex.).

As used throughout this application, the term "polyethylene" or "PE" refers (unless indicated otherwise) to ethylene homopolymers or copolymers. Such copolymers of ethylene include copolymers of ethylene with at least one alpha-olefin and copolymers of ethylene with other units or groups such as vinyl acetate or otherwise. The term "polyethylene" or "PE" is used without regard to the presence or absence of substituent branch groups.

As used throughout this application, the term "polyethylene polymer" refers to high density polyethylene, low density polyethylene ethylene alpha-olefin copolymer and blends of such.

As used throughout this application, the term "high density polyethylene" or "HDPE" refers to both (a) homopolymers of ethylene which have densities from about 0.960 g/cm$^3$ to about 0.970 g/cm$^3$ and (b) copolymers of ethylene and an alpha-olefin (usually 1-butene or 1-hexene) which have densities from about 0.940 g/cm$^3$ to about 0.958 g/cm$^3$. HDPE includes polymers made with Ziegler or Phillips type catalysts and polymers made with single-site metallocene catalysts. HDPE also includes high molecular weight "polyethylenes." In contrast to HDPE, whose polymer chain has some branching, are "ultra high molecular weight polyethylenes," which are essentially unbranched specialty polymers having a much higher molecular weight than the high molecular weight HDPE. Non-limiting examples of high density polyethylene useful in various embodiments of the present application include those having a density of from about 0.950 g/cm$^3$ to about 0.965 g/cm$^3$. Specific non-limiting examples include MarFlex® 9608, having a reported density of 0.962 g/cm$^3$ and a reported melt index of 8 g/10 min (at 190° C./2.16 kg), available from Chevron Phillips Chemical Company LP (The Woodlands, Tex.) and Alathon® H6012 having a reported density of about 0.960 g/cm$^3$ and a reported melt index of 12 g/10 min (at 190° C./2.16 kg), available from Lyondell Chemical Company (Houston, Tex.).

As used throughout this application, the term "low density polyethylene" or "LDPE" refers to branched homopolymers having densities from about 0.915 g/cm$^3$ to about 0.930 g/cm$^3$, as well as copolymers containing polar groups resulting from copolymerization (such as with vinyl acetate or ethyl acrylate). LDPE typically contains long branches off the main chain (often termed "backbone") with alkyl substituents of two to eight carbon atoms. Non-limiting examples of low density polyethylene useful in various embodiments of the present application include those having a melt index of from about 0.1 g/10 min to about 20 g/10 min (at 190° C./2.16 kg) or from about 0.1 g/10 min to about 12 g/10 min (at 190° C./2.16 kg) or from about 0.6 g/10 min to about 20 g/10 min (at 190° C./2.16 kg) or from about 4 g/10 min to about 4.5 g/10 min (at 190° C./2.16 kg). Specific non-limiting examples include Petrothene® NA 214-000, having a reported density of 0.918 g/cm$^3$ and a reported melt index of 10 g/10 min (at 190° C./2.16 kg), available from Equistar Chemicals, LP (Houston, Tex.), and Dow™ LDPE 5004I, having a reported density of 0.924 g/cm$^3$ and a reported melt index of 4.2 g/10 min (at 190° C./2.16 kg), available from The Dow Chemical Company (Midland, Mich.).

As used throughout this application, the terms "copolymer of ethylene and at least one alpha-olefin" or "ethylene alpha-olefin copolymer" refer to a modified or unmodified copolymer produced by the co-polymerization of ethylene and any one or more alpha-olefins. Suitable alpha-olefins include, for example, $C_3$ to $C_{20}$ alpha-olefins such as propene, 1-butene, 1-pentene, 1-hexene, 1-octene, 1-decene and blends of such. The co-polymerization of ethylene and an alpha-olefin may be produced by heterogeneous catalysis, such as co-polymerization reactions with Ziegler-Natta catalysis systems, including, for example, metal halides activated by an organometallic catalyst (e.g., titanium chloride) and optionally containing magnesium chloride complexed to trialkyl aluminum. Heterogeneous catalyzed copolymers of ethylene and an alpha-olefin may include linear low density polyethylene (LLDPE), very low density polyethylene (VLDPE) and ultra low density polyethylene (ULDPE) (commercially available as, for example, Dowlex™ from The Dow Chemical Company (Midland, Mich.)). Additionally, the co-polymerization of ethylene and an alpha-olefin may also be produced by homogeneous catalysis, such as co-polymerization reactions with metallocene catalysis systems which include constrained geometry catalysts, (e.g., monocyclopentadienyl transition-metal complexes). Homogeneous catalyzed copolymers of ethylene and alpha-olefin may include modified or unmodified ethylene alpha-olefin copolymers having a long-chain branched (i.e., 8-20 pendant carbons atoms) alpha-olefin co-monomer (commercially available as, for example, Affinity™ and Attane™ from The Dow Chemical Company (Midland, Mich.)), linear copolymers (commercially available as, for example, Tafmer™ from the Mitsui Petrochemical Corporation (Tokyo, Japan)), and modified or unmodified ethylene alpha-olefin copolymers having a short-chain branched (i.e., 3-6 pendant carbons atoms) alpha-olefin co-monomer (commercially available as, for example, Exact™ from ExxonMobil Chemical Company (Houston, Tex.)). In general, homogeneous catalyzed ethylene alpha-olefin copolymers may be characterized by one or more methods known in the art, including but not limited to molecular weight distribution (Mw/Mn), composition distribution breadth index (CDBI), narrow melting point range and single melting point behavior.

As used throughout this application, the term "modified" refers to a chemical derivative, such as one having any form of anhydride functionality (e.g., anhydride of maleic acid, crotonic acid, citraconic acid, itaconic acid, fumaric acid, etc.), whether grafted onto a polymer, copolymerized with a polymer or blended with one or more polymers. The term is also inclusive of derivatives of such functionalities, such as acids, esters and metal salts derived from such.

Referring now to the drawings, with some but not all embodiments shown, with elements depicted as illustrative and not necessarily to scale, and with the same (or similar) reference numbers denoting the same (or similar) features throughout the drawings, FIG. 1 is a cross-sectional view of a first embodiment of a package according to the present application. Package 10 depicted in FIG. 1 is a generalized embodiment and comprises first sealant layer 25 and second sealant layer 29 sealed together to form peelable seal 23. First sealant layer 25 and second sealant layer 29 may be layers of the same film, sheet, etc. or layers of two different films, sheets, etc. First sealant layer 25 and second sealant layer 29 may be sealed together by any manner known in the art, including but not limited to heat sealing and impulse sealing.

First sealant layer 25 comprises low density polyethylene (as described above) in an amount from about 70% to about 95% by weight of first sealant layer 25. In various embodiments of the present application, this low density polyethylene may be present in first sealant layer 25 is an amount from about 75% to about 90% or from about 80% to about 90% or about 85% or about 86.5% by weight of first sealant layer 25. First sealant layer 25 also comprises a first contaminant in an amount from about 5% to about 30% by weight of first sealant layer 25. In various embodiments of the present application, this first contaminant may be present in first sealant layer 25 in an amount from 10% to about 25% or from about 10% to about 20% or about 15% or about 13.5% by weight of the first sealant layer. This first contaminant comprises propylene/ethylene copolymer with low ethylene content (i.e., from about 0.1 mol % to about 5 mol % or from about 2 mol % to about 3 mol %), polypropylene homopolymer, butene/ethylene copolymer or polybutene homopolymer (as each is described above). In various embodiments of the present application first sealant layer 25 has a thickness of less than about 9 mils or from about 1 mil to about 5 mil or from about 3 mil to about 3.5 mil.

Second sealant layer 29 comprises polyethylene polymer (as described above) in an amount from about 70% to about 90% by weight of second sealant layer 29. In various embodiments of the present application, the polyethylene polymer of second sealant layer 29 may comprise high density polyethylene in an amount from about 70% to about 90% by weight of second sealant layer 29. In further embodiments, the polyethylene polymer of second sealant layer 29 may comprise two different high density polyethylene. The first high density polyethylene may be present in second sealant layer 29 in an amount from about 50% to about 65% or from about 55% to about 60% or about 57% by weight of second sealant layer 29. The second high density polyethylene may be present in an amount from about 15% to about 25% or from about 17% to about 23% or about 20% by weight of second sealant layer 29. In other various embodiments of the present application, the polyethylene polymer of second sealant layer 29 may comprise high density polyethylene in an amount from about 40% to about 60% or from about 45% to about 55% or about 50% by weight of second sealant layer 29 and low density polyethylene in an amount from about 25% to about 35% or about 27% to about 33% or about 30% by weight of second sealant layer 29. In other embodiments, the polyethylene polymer of second sealant layer 29 may comprise low density polyethylene in an amount from about 70% to about 90% by weight of second sealant layer 29 or may comprise a blend of low density polyethylene and ethylene alpha-olefin copolymer or may comprise a blend of any or all or high density polyethylene, low density polyethylene and ethylene alpha-olefin copolymer Second sealant layer 29 also comprises a second contaminant in an amount from about 10% to about 30% by weight of second sealant layer 29. In various embodiments of the present application, this second contaminant may be present in second sealant layer 29 in an amount from about 15% to about 25% or about 20% by weight of second sealant layer 29. This second contaminant comprises propylene/ethylene copolymer with low ethylene content (i.e., from about 0.1 mol % to about 5 mol % or from about 2 mol % to about 3 mol %), polypropylene homopolymer, butene/ethylene copolymer or polybutene homopolymer (as each is described above). The composition of the first contaminant of first sealant layer 25 may be the same as or different from the composition of the second contaminant of second sealant layer 29. Additionally, in various embodiments of the present application, second sealant layer 29 has a thickness of less than about 4 mils or from about 0.1 mil to about 2 mil or from about 0.5 mil to about 0.8 mil or about 0.6 mil.

First sealant layer 25 and second sealant layer 29 each may be manufactured by any of various methods known in the art, including but not limited to blown coextrusion, cast coextrusion, adhesive lamination or coating, extrusion lamination or coating, or combinations of such methods. The particular low density polyethylene and first contaminant (and optional other materials) for first sealant layer 25 and the particular polyethylene polymer and second contaminant (and optional other materials) for second sealant layer 29 are selected based on the manufacturing method, the rheology of the other materials in the sealant layer and other factors known in the art. As a non-limiting example, a polybutene with a higher melt index may be selected if the sealant layer is to be manufactured via cast coextrusion; a polybutene with a lower melt index may be selected if the sealant layer is to be manufactured via blown coextrusion. In the various embodiments of the present application the method of combining the low density polyethylene and the first contaminant and the polyethylene polymer and the second contaminant is not critical. Melt blending (compounding) or dry blending are examples of methods that may be used to combine or blend the components.

As described above, first sealant layer 25 and second sealant layer 29 are adapted to be sealed together to form peelable seal 23. Peelable seal 23 may have any configuration known in the art, including flat seal, contour seal, spot seal, flood seal, etc. In accordance with the present application, peelable seal 23 seal may have a burst strength greater than about 7.4 psi in accordance with ASTM F2054 (as described below) and an initial opening force of less than about 2,500 g/inch in accordance with ASTM F88 or with ASTM F88 as modified for a 45-degree tray peel test (as described below). In various embodiments of the present application, peelable seal 23 may have a burst strength between about 10 psi and 50 psi in accordance with ASTM F2054 and an initial opening force between about 0 g/inch and 2,000 g/inch in accordance with ASTM F88 or with ASTM F88 as modified for a 45-degree tray peel test. Each of first sealant layer 25 and second sealant layer 29 has a contaminant (i.e., the first contaminant in first sealant layer 25 and the second contaminant in second sealant layer 29); however, peelable seal 23 surprisingly seals better through "contamination," i.e., the accumulation of any package contents on one or both of the sealant layers prior to formation of a seal than a peelable seal with only one sealant layer having a contaminant (as indicated by an increased burst strength) (see, for example, Example 1 contrasted with Comparative Example 3 and Comparative Example 7, as each is further described below), and peelable seal 23 has, in some embodiments, from about a 44% to about a 59% reduction in initial opening force compared to a peelable seal with only one sealant layer having a contaminant (see, for example, Example 15 contrasted with Comparative Example 3 in Table 12 below and Example 1 contrasted with Comparative Example 3 in Table 8 below).

Additionally, due to the characteristics of first sealant layer 25 and second sealant layer 29, in some embodiments of the present application, peelable seal 23 (as described above) may be formed at a lower seal initiation temperature than that already known in the art. As a non-limiting example, first sealant layer 25 and second sealant layer 29 may be sealed together to form peelable seal 23 at a sealing temperature from about 120° C. to about 130° C. and a sealing pressure of 50 psi (with one second dwell time) (see FIG. 16, further described below). As a further non-limiting example, first sealant layer 25 and second sealant layer 29 may be sealed together to form peelable seal 23 at a sealing temperature of from about 210° C. to about 225° C. and a sealing pressure of from about 43 psi to about 87 psi. Additionally, first sealant layer 25 and second sealant layer 29 may be sealed together to from peelable seal 23 at a sealing temperature from about 220° C. to about 230° C. and a sealing pressure from about 20 psi to about 25 psi Dwells times to create the peelable 23 may vary as known in the art. Such times include but are not limited to less than 0.92 seconds. 0.92 seconds, greater than 0.92 seconds, less than 1 second, 1 second and greater than 1 second.

First sealant layer 25 and second sealant layer 29 may be components of the same film, sheet, etc. or components of different films, sheets, etc. As such, in the embodiments of the present application, the various packages may take various forms, including but not limited to a lap seal bag, a four-side sealed pouch and a thermoformed cup with a lidding film.

Figure 2:
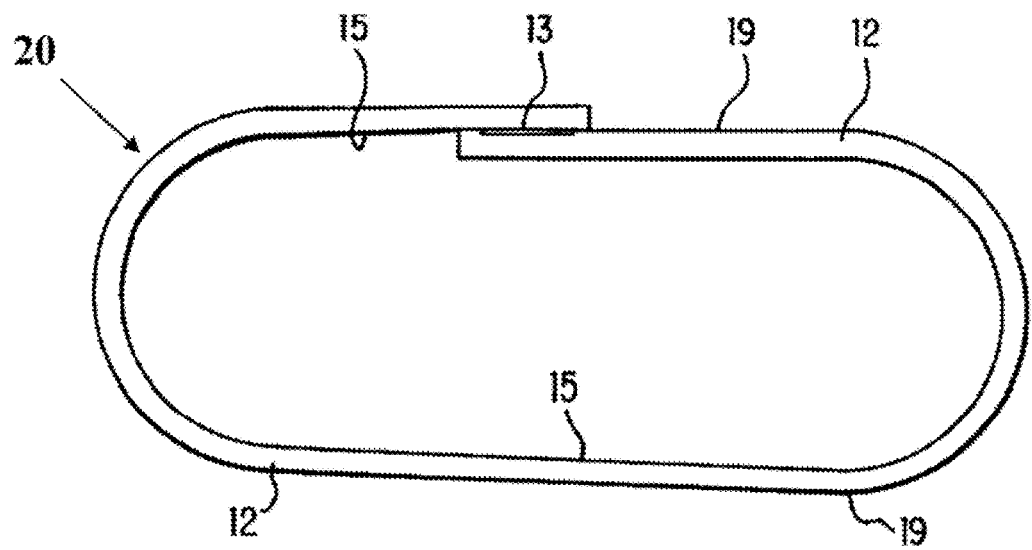
FIG. 2 is cross-sectional view of a second embodiment of a package according to the present application.

FIG. 2 is cross-sectional view of a second embodiment of a package according to the present application. Package 20 depicted in FIG. 2 is a lap-seal bag embodiment and comprises film 12 comprising a first sealant layer with first sealant layer outer surface 15 and a second sealant layer with second sealant layer outer surface 19. In this embodiment, the first sealant layer and the second sealant layer are components of the same film, film 12. FIG. 2 does not depict the individual sealant layers per se but depicts the outer surface of each of the sealant layers. In forming package 20, the first sealant layer and the second sealant layer are sealed, joined, welded, etc. together at first sealant layer outer surface 15 and second sealant layer outer surface 19 to form peelable seal 13. In the embodiment of FIG. 2, the first sealant layer, the second sealant layer and peelable seal 13 have similar composition and characteristics to that described above. Additionally, in the embodiment of FIG. 2, the first sealant layer (with first sealant layer outer surface 15) is the interior layer of film 12, relative to the contents of package 20, and the second sealant layer (with second sealant layer outer surface 19) is the exterior layer of film 12, relative to the contents of package 20. However, in other various embodiments of the present application, the positions may be reversed.

Figure 3:
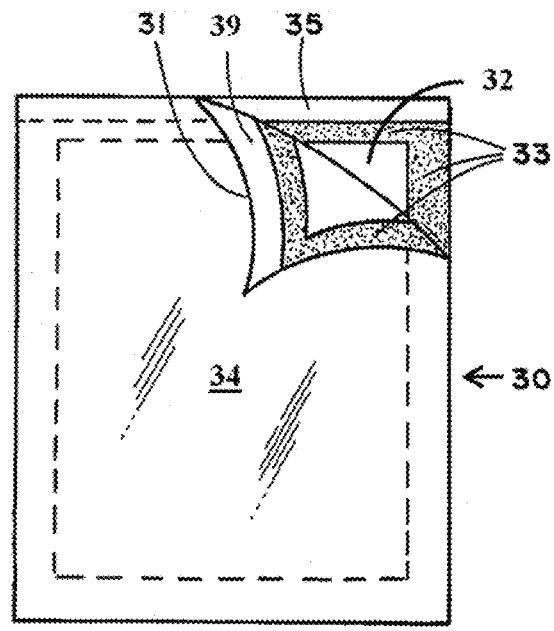
FIG. 3 is a plan view of a third embodiment of a package according to the present application.

FIG. 3 is a plan view of a third embodiment of a package according to the present application. Package 30 depicted in FIG. 3 is a four-side sealed pouch partially peeled open at corner 31. Package 30 comprises first film 32 comprising a first sealant layer with first sealant layer outer surface 35; package 30 also comprises second film 34 comprising a second sealant layer with second sealant layer outer surface 39. FIG. 3 does not depict the individual sealant layers per se but depicts the outer surface of each of the sealant layers. In forming package 30, the first sealant layer and the second sealant layer are sealed, joined, welded, etc. together at first sealant layer outer surface 35 and second sealant layer outer surface 39 to form peelable seal 33, as shown in the partially peeled open package 30 of FIG. 3. In the embodiment of FIG. 3, the first sealant layer, the second sealant layer and peelable seal 33 have similar composition and characteristics to that described above. Additionally, in the embodiment of FIG. 3, the first sealant layer (with first sealant layer outer surface 35) is the interior layer of first film 32 and the second sealant layer (with second sealant layer outer surface 39) is the interior layer of second film 34, each relative to the contents of package 30.

Figure 4:
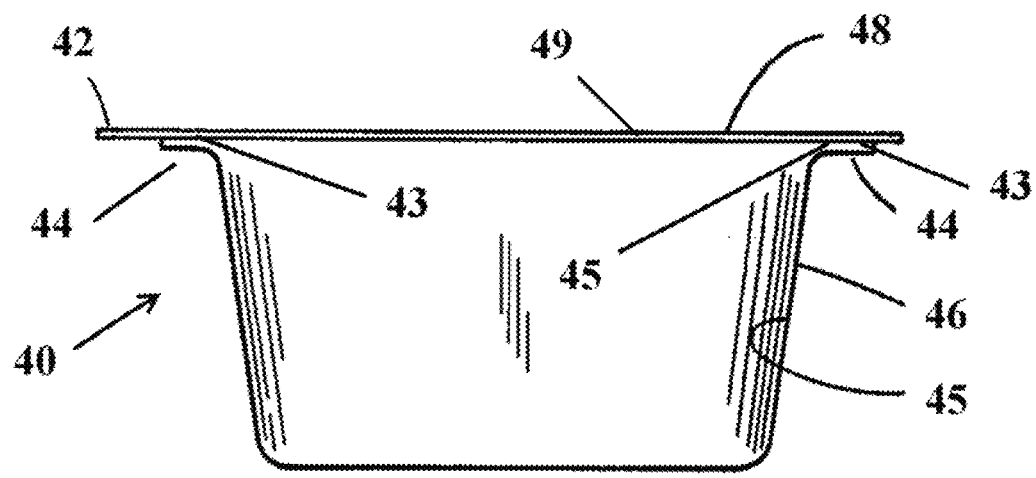
FIG. 4 is a cross-sectional view of a fourth embodiment of a package according to the present application.

FIG. 4 is a cross-sectional view of a fourth embodiment of a package according to the present application. Package 40 depicted in FIG. 4 comprises container 46 sealed to lid 48. Container 46 (as a first film) comprises a first sealant layer with first sealant layer outer surface 45. Lid 48 (as a second film) comprises a second sealant layer with second sealant layer outer surface 49. FIG. 4 does not depict the individual sealant layers per se but depicts the outer surface of each of the sealant layers. In forming package 40, the first sealant layer and the second sealant layer are sealed, joined, welded, etc. together at first sealant layer outer surface 45 and second sealant layer outer surface 49 to form peelable seal 43. In the embodiment of FIG. 4, the first sealant layer, the second sealant layer and peelable seal 43 have similar composition and characteristics to that described above. Additionally, in the embodiment of FIG. 4, the first sealant layer (with first sealant outer surface 45) is the interior layer of container 46 and the second sealant layer (with second sealant outer surface 49) is the interior layer of lid 48, each relative to the contents of package 30.

Figure 5:
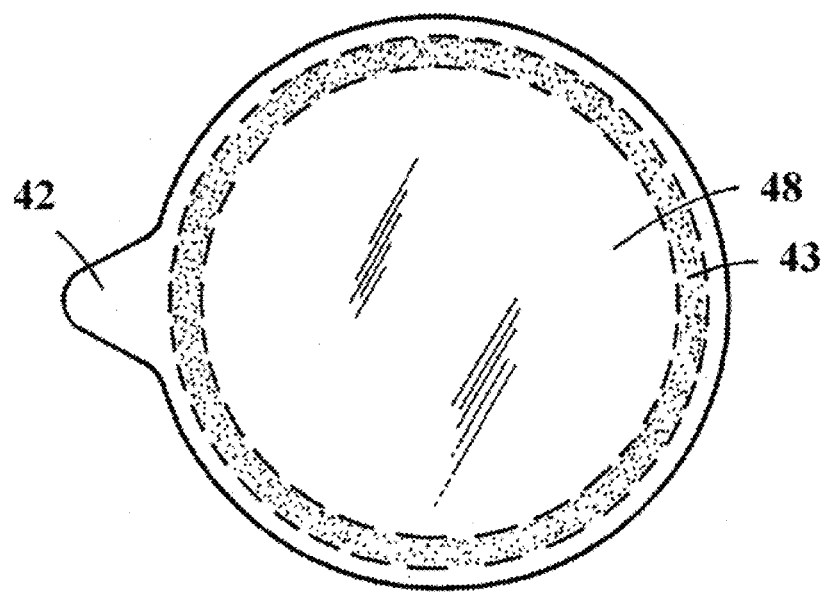
FIG. 5 is a top elevational view of the sealed package of FIG. 4.

In the embodiment of FIG. 4, peelable seal 43 may be effected between lip 44 of container 46 and the periphery of lid 48. FIG. 5 is a top elevational view of package 40 of FIG. 4 and depicts peelable seal 43 around the periphery of lid 48. As shown in FIGS. 4 and 5, package 40 may also comprise pull tab 42 to assist in peeling and removing lid 48 from container 46 at peelable seal 43. Pull tab 42 may protrude to a side, edge or corner of container 46. In various embodiments of the present application, package 40 may be readily opened by placing two fingers of one hand on opposite surfaces of pull tab 42 and placing two fingers of the other hand on opposite surfaces of an exposed area of lid 48 to peel and remove lid 48 towards the rear or back edge of package 40 to expose the opening of container 46.

Figure 6:
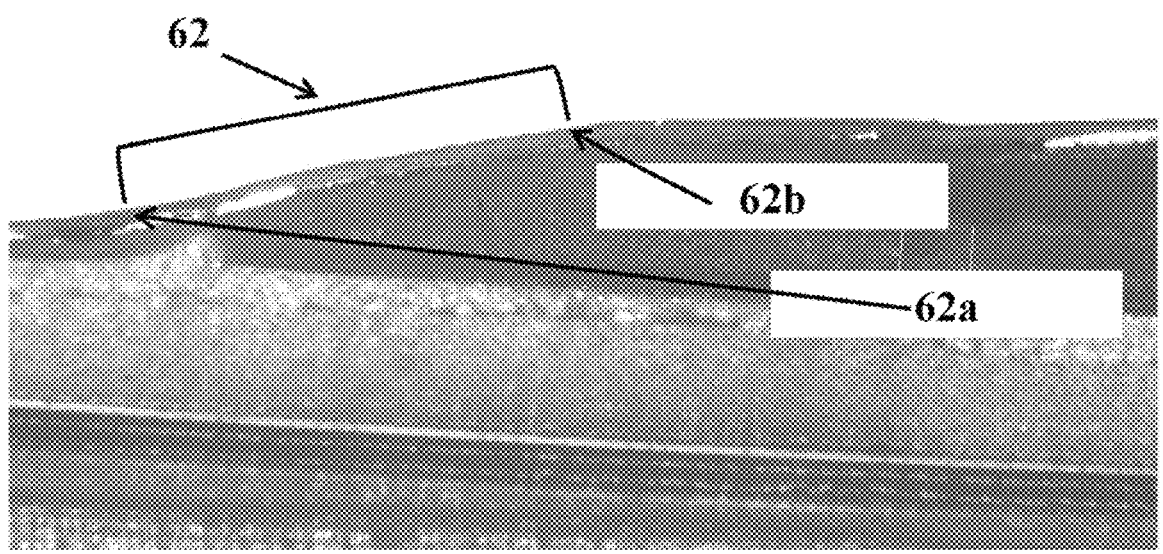
FIG. 6 is a picture of the cross-section of a seal at five times magnification.

As described in the present application, a peelable seal (for example, peelable seal 43) may have any configuration known in the art, including flat seal (with an x-dimension and a y-dimension and a relatively flat, if any, z-dimension), contour or ring seal (with an x-dimension, a y-dimension and relatively curved or otherwise "contoured" z-dimension.), spot seal (in specific areas), flood seal (in all areas), etc. FIG. 6 is a picture of the cross-section of a contour or ring seal at five times magnification. The contour seal of FIG. 6 includes contour section 62, having approximate first end 62a and approximate second end 62b.

Figure 7:
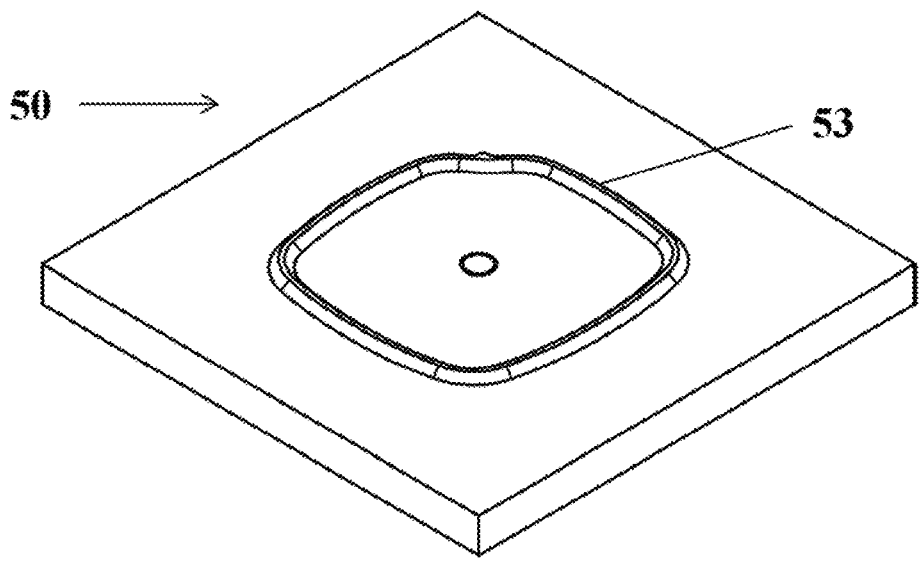
FIG. 7 is a top perspective view of an embodiment of a partial contoured seal platen.

A flat seal may be effected by using a flat seal platen in sealing, joining, welding, etc. the first sealant layer and the second sealant layer. A contour seal may be effected by using a contoured seal platen in sealing, joining, welding, etc. the first sealant layer and the second sealant layer. Formation of a contour seal may "squeeze out" or "push away" or disperse any contents of the filled package that may have accumulated, for example, on lip 44 during filling of container 46 (see FIG. 4). FIG. 7 is a top perspective view of an embodiment of a partial contoured seal platen. Partial contoured seal platen section 50 includes contour seal ring 53. Contour seal ring 53 of partial contoured seal platen section 50 in conjunction with another platen forms a contour seal with a contour (not flat) seal bead when the first sealant layer and the second sealant layer are sealed, joined, welded, etc. to form, for example, peelable seal 43 of FIG. 4. The thickness of the first sealant layer may positively or negatively impact the properties of the contour seal bead and the opening force needed to peel, for example, peelable seal 43 and remove lid 48 from container 46. As a non-limiting example, a thinner first sealant layer may have a positive impact on the contour seal bead properties (e.g., no gaps in the seal bead) and may result in a peelable seal with a lower opening force (such that an end user may find it easier to remove lid 48 from container 46); while a thicker first sealant layer may have a negative impact on the contour seal bead properties (e.g., gaps in the seal bead) and result in a peelable seal with a higher opening force (such that an end user may find it more difficult to remove lid 48 from container 46).

A first film (such as first film 32 of FIG. 3 and container 46 of FIG. 4) may comprise other layers in addition to a first sealant layer. Non-limiting examples of multilayer first films include those depicted in FIGS. 8-10.

Figure 8:
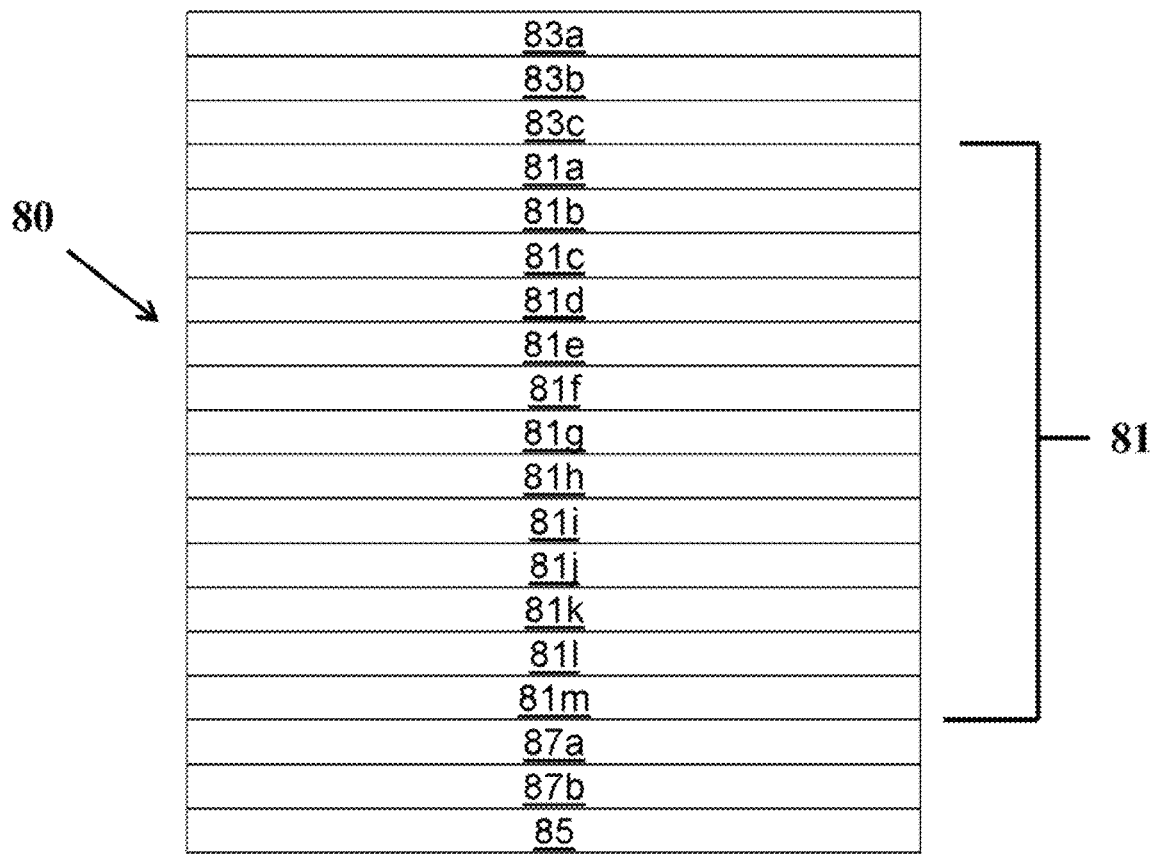
FIG. 8 is a cross-sectional view of a first embodiment of a first film comprising the first sealant layer according to the present application.

FIG. 8 is a cross-sectional view of a first embodiment of a first film comprising a first sealant layer (e.g., first sealant layer 85) according to the present application. Multilayer first film 80 depicted in FIG. 8 comprises film 81. In producing multilayer first film 80, film 81 is first produced on blown film equipment. Film 81 may comprise the layers as shown in Table 1.

TABLE 1

| Layer | Layer Composition |
|---|---|
| 81a | blend of styrene butadiene copolymer, impact polystyrene and processing aids |
| 81b | blend of high density polyethylene (not limited to those described above for the second sealant layer) and linear low density polyethylene |
| 81c | linear low density polyethylene |
| 81d | ethylene vinyl alcohol copolymer (e.g., with 27 mol % ethylene) |
| 81e | linear low density polyethylene |
| 81f | high density polyethylene (not limited to those described above for the second sealant layer) |
| 81g | ethylene vinyl acetate (e.g., with 18 weight % vinyl acetate) |
| 81h | high density polyethylene (not limited to those described above for the second sealant layer) |
| 81i | linear low density polyethylene |
| 81j | ethylene vinyl alcohol copolymer (e.g., with 27 mol % ethylene) |
| 81k | linear low density polyethylene |

TABLE 1-continued

| Layer | Layer Composition |
|---|---|
| 81l | blend of high density polyethylene (not limited to those described above for the second sealant layer) and linear low density polyethylene |
| 81m | blend of styrene butadiene copolymer, impact polystyrene and processing aids |

In producing film 81, one extruder is used for each of layers 81a through 81g. If a layer comprises more than one thermoplastic resin (as in, for example, 81a and 81b), the resins for that layer may be pre-blended prior to being added to the extruder. The layer components are then heated to form streams of melt-plastified polymers and extruded through a die. The coextruded plastified, extruded components then form a tubular extrudate (or bubble). The diameter of the tubular extrudate is expanded by air entering the extrudate at the die. The expanded tubular extrudate is then collapsed by a collapsing frame and flattened through nip rolls. The blown film equipment is operated at a high enough output rate (as determined by a person of ordinary skill in the art without undue experimentation) so that the collapsed, flattened tubular extrudate is of a sufficient temperature to laminate to itself at layer 81g and to produce a palindromic thirteen-layer film, film 81. To film 81, layers 83a, 83b and 83c are then cast-coextruded. These layers may have the composition as shown in Table 2.

TABLE 2

| Layer | Layer Composition |
|---|---|
| 83a | blend of crystal polystyrene, impact polystyrene and styrene butadiene copolymer |
| 83b | blend of crystal polystyrene, impact polystyrene and styrene butadiene copolymer |
| 83c | blend of impact polystyrene, styrene butadiene copolymer and processing aids |

In cast coextruding layers 83a, 83b and 83c, one die is used for each layer. The thermoplastic resins of each layer may be pre-blended prior to being cast. To film 81 with cast layers 83a, 83b and 83c, layers 87a, 87b and first sealant layer 85 are then cast-coextruded to produce multilayer first film 80. These layers may have the composition as shown in Table 3.

TABLE 3

| Layer | Layer Composition |
|---|---|
| 87a | blend of crystal polystyrene, impact polystyrene and styrene butadiene copolymer |
| 87b | linear low density polyethylene |
| 85 | first sealant layer as described above |

In cast coextruding layers 87a, 87b and first sealant layer 85, one die is used for each layer. The thermoplastic resins of layers 87a and first sealant layer 85 may be pre-blended prior to being cast.

Resulting multilayer first film 80 may then be thermoformed into articles, such as containers, trays, cups, etc. A description of "thermoformed" is provided above. Furthermore, thermoforming and other similar techniques are well known in the art for packaging. (See Throne, "Thermoforming," Encyclopedia of Polymer Science and Technology, Third Edition, 2003, Volume 8, pp. 222-251 (John Wiley & Sons, Inc., Hoboken, N.J.); see also Irwin, "Thermoforming," Modern Plastics Encyclopedia, 1984-1985, pp. 329-336 (McGraw-Hill, Inc., New York, N.Y.); see also "Thermoforming," The Wiley Encyclopedia of Packaging Technology, Second Edition, 1997, pp. 914-921 (John Wiley & Sons, Inc., New York, N.Y.).) Suitable thermoforming methods include standard, deep-draw or plug-assist vacuum forming. During standard vacuum forming, a thermoplastic web, such as a film or sheet, is heated and a vacuum is applied beneath the web allowing atmospheric pressure to force the web into a preformed mold. When relatively deep molds are employed, the process is referred to as a "deep-draw" application. In a plug-assist vacuum forming method, after the thermoplastic web has been heated and sealed across a mold cavity, a plug shape similar to the mold shape impinges on the thermoplastic web and, upon the application of vacuum, the thermoplastic web conforms to the mold surface.

Figure 9:
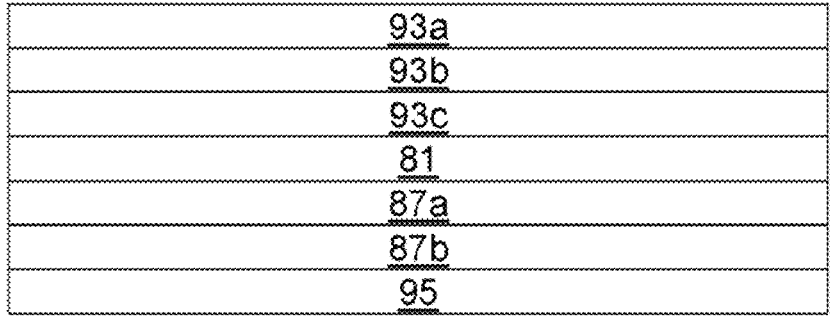
FIG. 9 is a cross-sectional view of a second embodiment of a first film comprising a first sealant layer according to the present application.

FIG. 9 is a cross-sectional view of a second embodiment of a first film comprising a first sealant layer (e.g., first sealant layer 95) according to the present application. Multilayer first film 90 depicted in FIG. 9 comprises film 81 as in TABLE 1. For multilayer first film 90, to film 81 layers 93a, 93b, 93c are then cast-coextruded. These layers may have the composition as shown in Table 4.

TABLE 4

| Layer | Layer Composition |
|---|---|
| 93a | blend of crystal polystyrene, impact polystyrene and styrene butadiene copolymer |
| 93b | blend of crystal polystyrene, impact polystyrene and styrene butadiene copolymer |
| 93c | blend of impact polystyrene, crystal polystyrene, styrene butadiene copolymer and processing aids |

In cast coextruding layers 93a, 93b and 93c, one die is used for each layer. The thermoplastic resins of each layer may be pre-blended prior to being cast. To film 81 with cast layers 93a, 93b and 93c, layers 87a, 87b and first sealant layer 95 are then cast-coextruded to produce multilayer first film 90. Layers 87a, 87b and first sealant layer 95 are as described in Table 3 (with first sealant layer 95 the same as or similar to first sealant layer 85). Resulting multilayer first film 90 may then be thermoformed into articles as described above.

Figure 10:
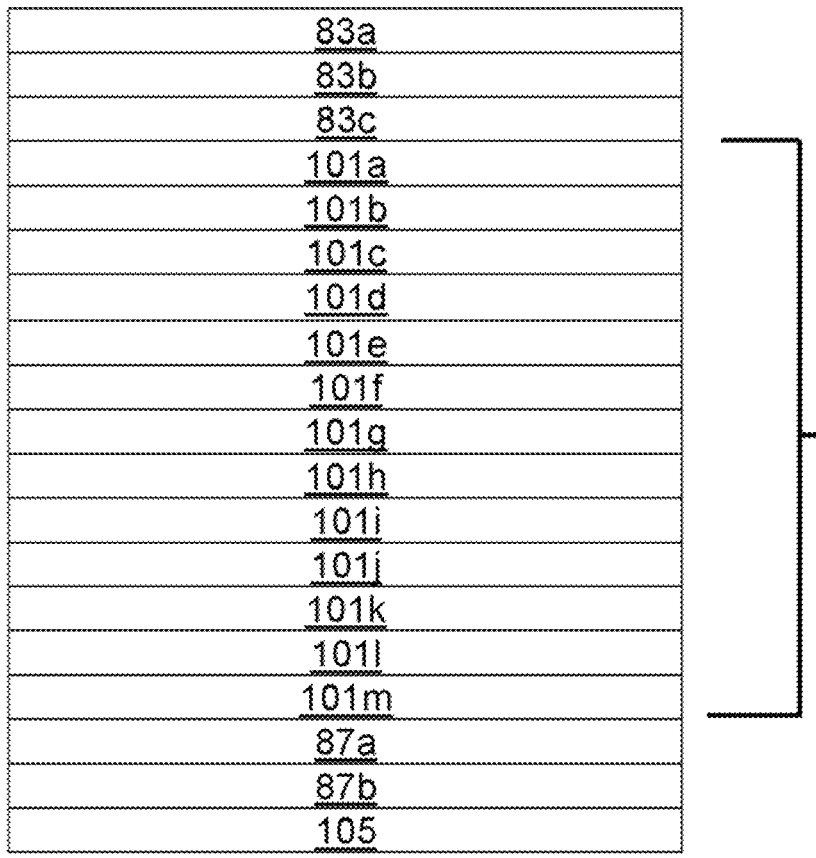
FIG. 10 is a cross-sectional view of a third embodiment of a first film comprising a first sealant layer according to the present application.

FIG. 10 is a cross-sectional view of a third embodiment of a first film comprising a first sealant layer (e.g., first sealant layer 105) according to the present application. Multilayer first film 100 depicted in FIG. 10 comprises film 101. In producing multilayer first film 100, film 101 is first produced on blown film equipment. Film 101 may comprise the layers as shown in Table 5.

TABLE 5

| Layer | Layer Composition |
|---|---|
| 101a | blend of styrene butadiene copolymer, impact polystyrene and processing aids |
| 101b | linear low density polyethylene |
| 101c | ethylene vinyl alcohol copolymer (e.g., with 38 mol % ethylene) |
| 101d | linear low density polyethylene |
| 101e | blend of high density polyethylene (not limited to those described above for the second sealant layer) and linear low density polyethylene |
| 101f | blend of high density polyethylene (not limited to those described above for the second sealant layer) and linear low density polyethylene |
| 101g | ethylene vinyl acetate (e.g., with 18 weight % vinyl acetate) |
| 101h | blend of high density polyethylene (not limited to those described above for the second sealant layer) and linear low density polyethylene |

TABLE 5-continued

| Layer | Layer Composition |
|---|---|
| 101i | blend of high density polyethylene (not limited to those described above for the second sealant layer) and linear low density polyethylene |
| 101j | linear low density polyethylene |
| 101k | ethylene vinyl alcohol copolymer (e.g., with 38 mol % ethylene) |
| 101l | linear low density polyethylene |
| 101m | blend of styrene butadiene copolymer, impact polystyrene and processing aids |

In producing film 101, one extruder is used for each of layers 101a through 101g. If a layer comprises more than one thermoplastic resin (as in, for example, 101a, 101e and 101f), the resins for that layer may be pre-blended prior to being added to the extruder. The layer components are then processed similar to film 81 to result in a collapsed, flattened tubular extrude. As with film 81, the blown film equipment is operated at a high enough output rate (as determined by a person of ordinary skill in the art without undue experimentation) so that the collapsed, flattened tubular extrudate is of a sufficient temperature to laminate to itself at layer 101g and to produce a palindromic thirteen-layer film, film 101. To film 101, layers 83a, 83b and 83c are then cast-coextruded. Layers 83a, 83b and 83c are as described in Table 2. To film 101 with cast layers 83a, 83b and 83c, layers 87a, 87b and first sealant layer 105 are then cast-coextruded to produce multilayer first film 100. Layers 87a, 87b and first sealant layer 105 are as described in Table 3 (with first sealant layer 105 the same as or similar to first sealant layer 85). Resulting multilayer first film 100 may then be thermoformed into articles as described above.

Similarly, a second film (such as second film 34 of FIG. 3 and lid 48 of FIG. 4) may comprise other layers in addition to a second sealant layer. Non-limiting examples of multilayer second films include those depicted in FIGS. 11-12.

FIG. 11 is a cross-sectional view of a first embodiment of a second film comprising a second sealant layer (e.g., second sealant layer 119) according to the present application. Multilayer second film 110 depicted in FIG. 11 comprises the layers as shown in Table 6.

TABLE 6

| Layer | Layer Composition |
|---|---|
| 111a | oriented polyethylene terephthalate (OPET) |
| 111b | blend of high density polyethylene (not limited to those described above for the second sealant layer) and low density polyethylene (not limited to those described above for the first sealant layer) |
| 111c | ethylene acrylic acid (e.g., with 9 weight % acrylic acid) |
| 111d | Foil |
| 111e | ethylene acrylic acid (e.g., with 9 weight % acrylic acid) |
| 111f | linear low density polyethylene |
| 119 | second sealant layer as described above |

To produce multilayer second film 110, the OPET layer is first printed. The remaining layers are then extrusion coated on the printed OPET layer in the order indicated. If a layer comprises more than one thermoplastic resin (as in, for example, 111b and 119), the resins for that layer may be pre-blended prior to being extrusion coated. The resulting multilayer second film 110 may then be cured for an appropriate period of time as known in the art. Following curing, multilayer second film 110 may be slit or die cut into, for example, lids or other materials for specific packaging applications.

FIG. 12 is a cross-sectional view of a second embodiment of a second film comprising a second sealant layer (e.g., second sealant layer 129) according to the present application. Multilayer second film 120 depicted in FIG. 12 comprises the layers as shown in Table 7.

TABLE 7

| Layer | Layer Composition |
|---|---|
| 122a | oriented polyethylene terephthalate (OPET) |
| 122b | blend of high density polyethylene (not limited to those described above for the second sealant layer) and low density polyethylene (not limited to those described above for the first sealant layer) |
| 122c | ethylene acrylic acid (e.g., with 9 weight % acrylic acid) |
| 122d | Foil |
| 122e | ethylene acrylic acid (e.g., with 9 weight % acrylic acid) |
| 129 | second sealant layer as described above |

Similar to multilayer second film 110, to produce multilayer second film 120, the OPET layer is first printed. The remaining layers are then extrusion coated on the printed OPET layer in the order indicated. If a layer comprises more than one thermoplastic resin (as in, for example, 122b and 129), the resins for that layer may be pre-blended prior to being extrusion coated. The resulting multilayer second film 120 may then be cured for an appropriate period of time as known in the art. Following curing, multilayer second film 120 may be slit or die cut into, for example, lidding film or other materials for specific packaging applications.

EXAMPLES

To further exemplify the various embodiments of the present application, several example first sealant layers were sealed, joined, welded, etc. to several example second sealant layers to form example seals. The materials included in the various examples are as follows.

CP1 is a general purpose crystal polystyrene having a reported melt flow rate of 9.0 g/10 min (200° C./5 kg) and a reported density of 1.04 g/cm$^3$. A non-limiting example of CP1 is Crystal Polystyrene 524B, commercially available from Total Petrochemicals USA Inc. (Houston, Tex.).

EL1 is an elastomer having a reported melt flow rate of 8.0 g/10 min (230° C./2.16 kg) and a reported density of 0.863 g/cm$^3$. A non-limiting example of EL1 is Developmental DE 3401.05, commercially available from The Dow Chemical Company (Midland, Mich.).

HDPE1 is a medium molecular weight high density polyethylene homopolymer having a reported melt index of 2.0 g/10 min in accordance with ASTM D 1238 and a reported density of 0.960 g/cm$^3$. A non-limiting example of HDPE1 is Alathon® M6020, commercially available from Equistar Chemicals, LP (Houston, Tex.).

HDPE2 is a high density polyethylene having a reported melt index of 8 g/10 min (190° C./2.16 kg) and a reported density of 0.962 g/cm$^3$. A non-limiting example of HDPE2 is MarFlex® 9608, commercially available from Chevron Phillips Chemical Company LP (Woodlands, Tex.).

HDPE3 is a medium molecular weight high density polyethylene homopolymer having a reported melt index of 12 g/10 min in accordance with ASTM D 1238 and a reported density of 0.960 g/cm$^3$. A non-limiting example of HDPE3 is Alathon® H6012, commercially available from Lyondell Chemical Company (Woodlands, Tex.).

LDPE1 is a low density polyethylene having a reported melt index of 4.2 g/10 min (190° C./2.16 kg) and a reported density of 0.924 g/cm$^3$. A non-limiting example of LDPE1 is Down' LDPE 5004I, commercially available from The Dow Chemical Company (Midland, Mich.).

LDPE2 is a low density polyethylene having a reported melt index of 10 g/10 min in accordance with ASTM D 1238 and a reported density of 0.918 g/cm$^3$. A non-limiting example of LDPE2 is Petrothene® NA 214-000, commercially available from Equistar Chemicals, LP (Houston, Tex.).

LLDPE1 is a linear low density polyethylene having a reported melt index of 0.90 g/10 min (190° C./2.16 kg) and a reported density of 0.919 g/cm$^3$. A non-limiting example of LLDPE1 is Dowlex™ 2645G, commercially available from The Dow Chemical Company (Midland, Mich.).

LLDPE2 is a linear low density polyethylene (e.g., ethylene-based hexene copolymer) having a reported melt index of 7.5 g/10 min in accordance with ASTM D 1238 and a reported density of 0.900 g/cm$^3$. A non-limiting example of LLDPE2 is Exact™ 3139, commercially available from ExxonMobil Chemical Company (Houston, Tex.).

PA is processing aids. Processing aids used vary depending on the equipment and materials and include but are not limited to antiblock agents, slip agents, stabilizing agents and release agents. Such aids are known to a person of ordinary skill in the art and may be determined without undue experimentation.

PB1 is a random copolymer of butene-1 with low ethylene content having a reported melt flow rate of 1 g/10 min (190° C./2.16 kg) and 28 g/10 min (190° C./10 kg) and a reported density of 0.906 g/cm$^3$. A non-limiting example of PB1 is Polybutene-1 PB 8640M, commercially available from LyondellBasell Industries (Houston, Tex.).

PB2 is a semi-crystalline polybutene homopolymer having a reported melt flow rate of 0.4 g/10 min (190° C./2.16 kg) and 12 g/10 min (190° C./10 kg) and a reported density of 0.914 g/cm$^3$. A non-limited example of PB2 is Polybutene-1 PB 0110M, commercially available from LyondellBasell Industries (Houston, Tex.).

PP1 is a polypropylene homopolymer having a reported melt flow rate of 3.5 g/10 min in accordance with ASTM D-1238 and a reported density of 0.9 g/cm$^3$. A non-limiting example of PP1 is Polypropylene Lumicene® M3382, commercially available from Total Petrochemicals & Refining USA, Inc. (Houston, Tex.).

PP2 is a polypropylene random copolymer having a reported melt flow of 1.9 g/10 min (230° C./2.16 kg) and a reported notched izod impact strength of 9.8 ft-lb/in (at room temperature). A non-limiting example of PP2 is R01C-00 Polypropylene Random Copolymer, commercially available from Ineos Olefins & Polymers USA (League City, Tex.).

PP3 is a specialty polypropylene having a reported melt flow rate of 53 g/10 min in accordance with ASTM D 1238 and a reported density of 0.901 g/cm$^3$. A non-limiting example of PP3 is P9H8M-015, commercially available from Flint Hill Resources (Longview, Tex.).

The resulting example seals were tested for various properties including burst strength, initial opening force and propagation opening force. At least five samples of each example were tested, and the average value is reported in the tables below.

Figure 13:
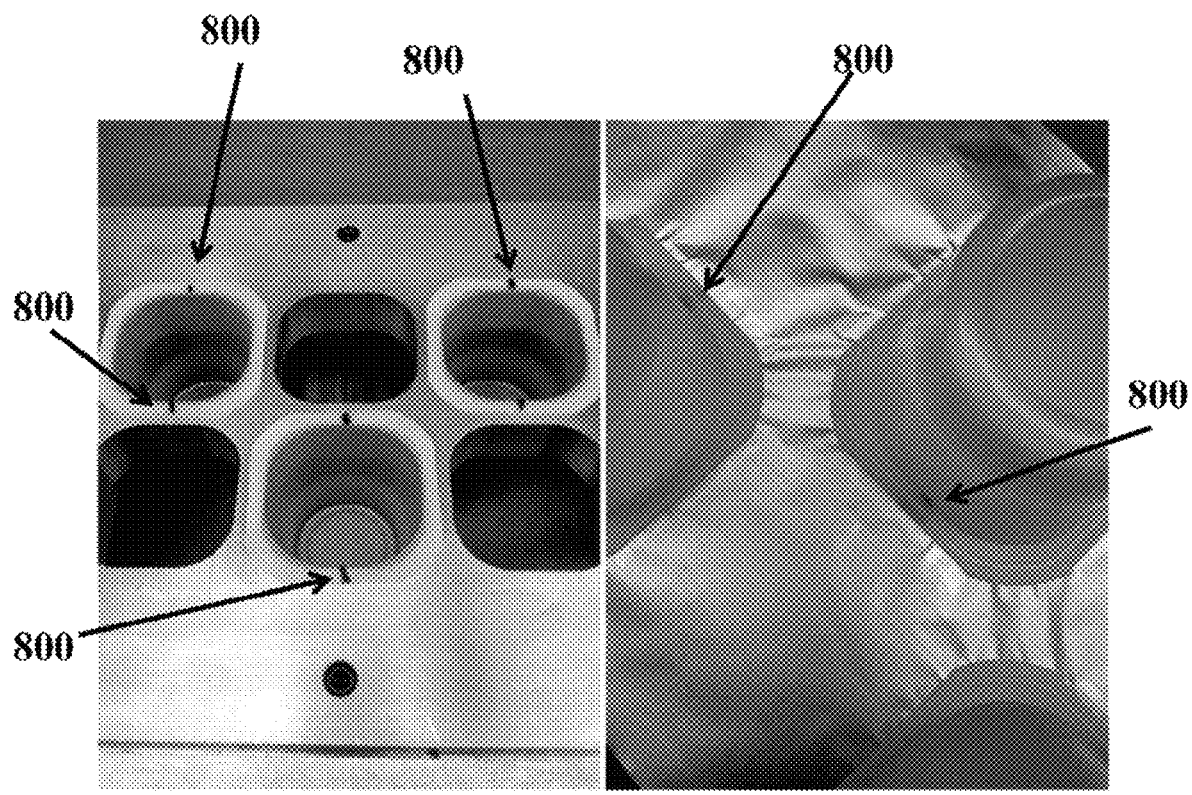
FIG. 13 is two pictures exemplifying "minor" level of contents accumulated on a first sealant layer.
Figure 14:
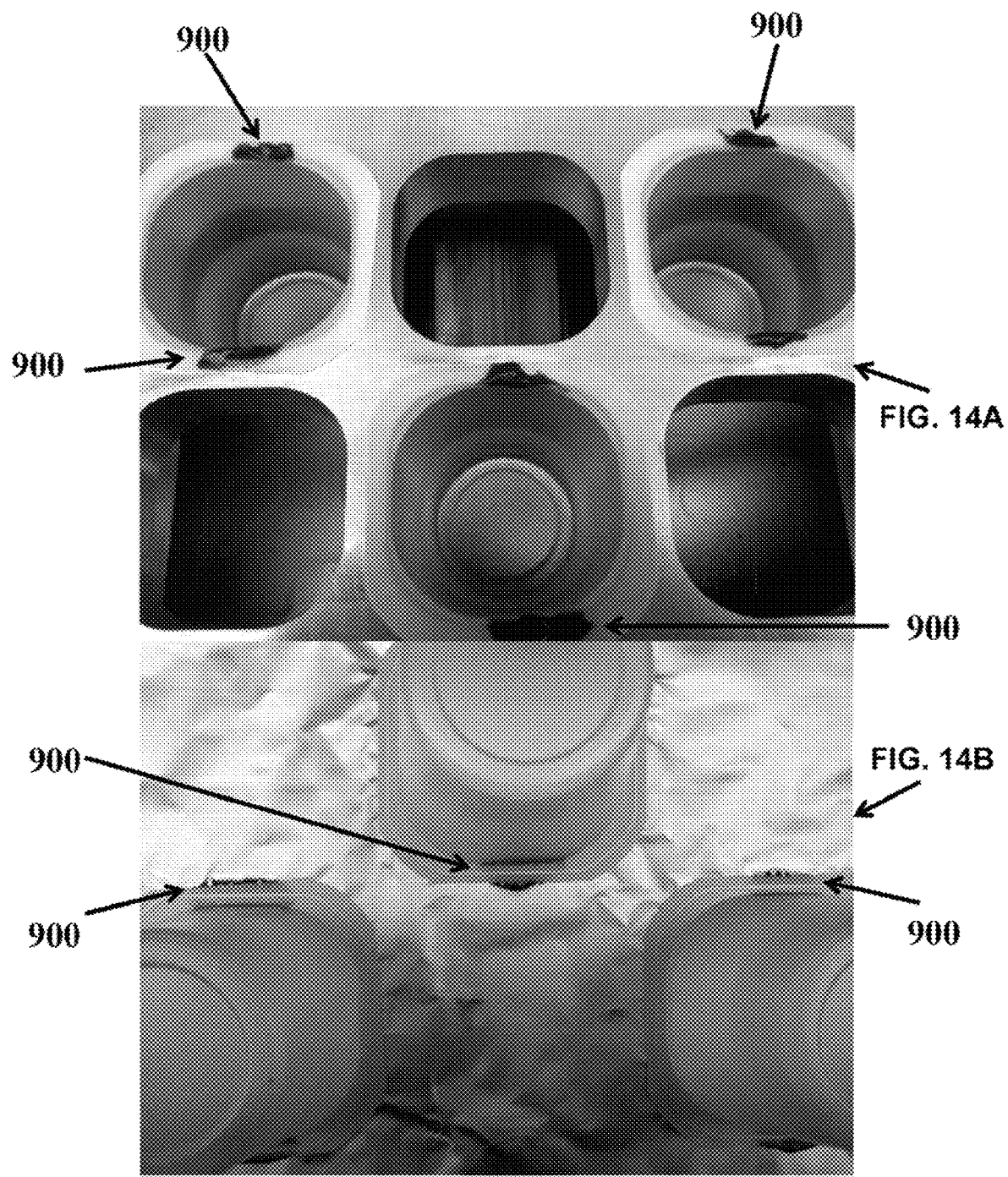
FIG. 14 is two pictures exemplifying "major" level of contents accumulated on a first sealant layer.

Burst strength is a measure of the pressure required to "burst" or otherwise separate an area of a package seal around the perimeter or periphery of or otherwise present in a package. Burst strength provides a means of evaluating a package seal's tendencies for failure when a package is exposed to a pressure differential. Burst strength also provides a means of evaluating a package seal's ability to seal through "contamination" (i.e., the accumulation of any contents on a sealant layer prior to formation of a seal). The burst strengths reported in the present application are expressed in psi and measured in accordance with ASTM F2054, "Standard Test Method for Burst Testing of Flexible Package Seals Using Internal Air Pressurization within Restraining Plates." Additionally, the burst strengths reported in the present application are of filled packages with varying levels of package contents accumulated on a first sealant layer prior to formation of a seal. Such varying levels include "clean" in which no contents of the package are accumulated on a first sealant layer, "minor" in which small spots or strings of package contents are accumulated on a first sealant layer and "major" in which large clumps or "globs" of package contents are accumulated on a first sealant layer and may hang over the edge of the sealant layer. FIG. 13 is two pictures exemplifying "minor" level of package contents accumulated on a first sealant layer. FIG. 13A on the left area of FIG. 13 depicts package contents 800 visible from one side (e.g., the topside) of the first sealant layer. FIG. 13B on the right area of FIG. 13 depicts package contents 800 visible from the opposite side (e.g., the underside) of the first sealant layer. FIG. 14 is two pictures exemplifying "major" level of package contents accumulated on a first sealant layer. FIG. 14A in the upper area of FIG. 14 depicts package contents 900 visible from one side (e.g., the topside) of the first sealant layer. FIG. 14B in the lower area of FIG. 14 depicts package contents 900 visible from the opposite side (e.g., the underside) of the first sealant layer.

Figure 15:
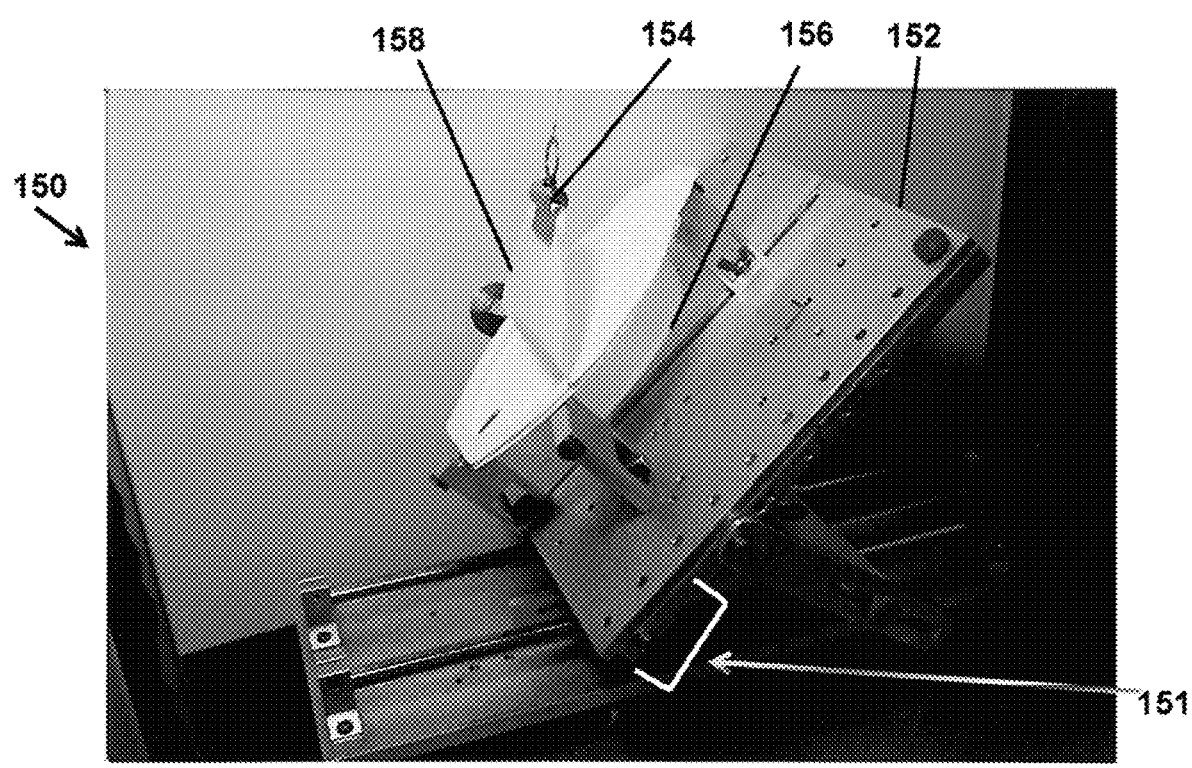
FIG. 15 is a picture of a 45-degree tray peel testing unit used to determine opening forces of seals in the present application.

Initial opening force is a measure of the force required to initially open a package. The initial opening force correlates to the strength of the seal at the opening initiation point. Propagation opening force is a measure of the force required to continue to open a package after the opening is initiated. The propagation opening force correlates to the strength of the seal at the opening continuation or propagation points. The opening forces reported in the present application are expressed in grams per inch and are measured in accordance with ASTM F88, "Standard Test Method for Seal Strength of Flexible Barrier Materials" or with ASTM F88 as modified for a 45-degree tray peel test. With the modification, a packaging tray (instead of packaging material strips) is secured in a bottom rigid sliding plate while the flexible tail is held in the movable top grip; the tray cover (e.g., lid) is then pulled from a corner at an angle of 45 degrees at a crosshead speed of 10 inches per minute or as otherwise indicated. FIG. 15 is a picture of a 45-degree tray peel testing unit used to determine opening forces of seals in some examples of the present application. Testing unit 150 comprises bottom rigid sliding plate 152 holding packaging tray 156. Movable top grip 154 secures lid 158 and pulls lid at 45-degree angle 151

In a first example set reported in Table 8, various first sealant layers having the approximate thickness, composition and package contents level ("clean," "minor" or "major") indicated were thermoformed into cups, filled with product and sealed to various second sealant layers that were slit/die cut into lidding film and had the approximate thickness and composition indicated. If noted as "compounded," the components were compounded or melt blended prior to cast coextrusion or extrusion coating or otherwise forming the specific sealant layer. All seals, with the exception of the seal for Comparative Example 3 for the initial opening force, were contour seals formed at a sealing temperature of 220° C., a sealing pressure of 25 psi and a dwell time of 0.92 seconds. The seal for Comparative Example 3 for the initial opening force was a contour seal created at a temperature of 228° C. and a pressure of 20 psi. The various burst strengths and initial opening forces were determined and are reported in Table 8.

TABLE 8

| | First Sealant Layer | Second Sealant Layer | Burst Strength Clean (psi) | Burst Strength Minor (psi) | Burst Strength Major (psi) | Initial Opening Force (g/inch) 45 degree angle, 10"/minute |
|---|---|---|---|---|---|---|
| Example 1 | ~3.5 mil 85% LDPE1 + 15% PB1 (compounded) | ~0.6 mil 57% HDPE2 + 20% HDPE3 + 20% PB2 + 3% PA | 18.14 | | 14.77 | 1059 |
| Example 2 | ~3.5 mil 85% LDPE1 + 15% PB1 (compounded) | ~0.75 mil 57% HDPE2 + 20% HDPE3 + 20% PB2 + 3% PA (compounded) | 20.49 | | 20.17 | 1270 |
| Comparative Example 1 | ~3.4 mil 85% HDPE1 + 15% PB1 | ~0.6 mil 57% HDPE2 + 20% HDPE3 + 20% PB2 + 3% PA | 29.73 | | 14.98 | 3007 |
| Comparative Example 2 | ~3.4 mil 85% HDPE1 + 15% PB1 | ~0.5 mil 40.7% LLDPE1 + 50% LLDPE2 + 9.3% PA | 41.00 | | 31.83 | cannot separate/ lid tore |
| Comparative Example 3 | ~9 mil 100% LDPE1 | ~0.6 mil 57% HDPE2 + 20% HDPE3 + 20% PB2 + 3% PA | 30.48 | 30.18 | 29.63 | 2556 |

As shown by Examples 1 and 2, a first sealant layer comprising low density polyethylene and a first contaminant sealed to a second sealant layer comprising polyethylene polymer and a second contaminant produced a seal having (1) a burst strength indicative of sealing through "contamination" and of a seal that remained intact when exposed to pressure differentials and (2) an initial opening force indicative of a seal that was peelable and easily opened (e.g., less than 2,500 g/inch initial opening force). However, as shown by Comparative Example 1, a first sealant layer comprising high density polyethylene (instead of low density polyethylene) and a first contaminant sealed to a second sealant layer comprising polyethylene polymer and a second contaminant produced a seal having an initial opening force indicative of a seal that was not peelable and was not easily opened (e.g., greater than 2,500 g/inch initial opening force). Also, as shown by Comparative Example 2, a first sealant layer comprising high density polyethylene (instead of low density polyethylene) and a first contaminant sealed to a second sealant layer comprising linear low density polyethylene but no second contaminant also produced a seal having an initial opening force indicative of a seal that was not peelable and was not easily opened. (In this instance, the seal was unable to be separated and tore.) Furthermore, as shown by Comparative Example 3, a first sealant layer comprising low density polyethylene but no first contaminant sealed to a second sealant layer comprising polyethylene polymer and a second contaminant produced a seal having an initial opening force indicative of a seal that was not peelable and was not easily opened.

In a second example set reported in Table 9, various first sealant layers having the approximate thickness, composition and package contents level ("clean," "minor" or "major") indicated were, thermoformed into cups, filled with product and sealed to various second sealant layers that were slit/die cut into lidding film and had the approximate thickness and composition indicated. As above, if noted as "compounded," the components were compounded or melt blended prior to cast coextrusion or extrusion coating or otherwise forming the specific sealant layer. All seals were contour seals formed at a sealing temperature of 220° C., a sealing pressure of 25 psi and a dwell time of 0.92 seconds. The various burst strengths, initial opening forces and propagation opening forces were determined and are reported in Table 9.

TABLE 9

| | First Sealant Layer | Second Sealant Layer | Burst Strength Clean (psi) | Burst Strength Minor (psi) | Burst Strength Major (psi) | Initial Opening Force (grams/in) 45 degree angle, 10"/minute | Propagation Opening Force (grams/in) 45 degree angle, 10"/minute |
|---|---|---|---|---|---|---|---|
| Example 3 | ~3.5 mil 86.5% LDPE1 + 15% PB1 | ~0.6 mil 57% HDPE2 + 20% HDPE3 + 20% PB2 + 3% PA | 16.62 | 15.49 | 14.31 | 1528 | 707 |
| Example 4 | ~3.5 mil 86.5% LDPE1 + 15% PB1 | ~.85 mil 50% HDPE3 + 30% LDPE2 + 20% PB2 (compounded) | 21.08 | 18.93 | 19.19 | 1701 | 863 |
| Example 5 | ~3.5 mil 90% LDPE1 + 10% PB1 (compounded) | ~0.6 mil 57% HDPE2 + 20% HDPE3 + 20% PB2 + 3% PA | 16.37 | 16.61 | 15.06 | 1288 | 656 |
| Example 6 | ~3.5 mil 90% LDPE1 + 10% PB1 (compounded) | ~.85 mil 50% HDPE3 + 30% LDPE2 + 20% PB2 (compounded) | 24.18 | 20.44 | 20.20 | 1723 | 801 |

TABLE 9-continued

| | First Sealant Layer | Second Sealant Layer | Burst Strength Clean (psi) | Burst Strength Minor (psi) | Burst Strength Major (psi) | Initial Opening Force (grams/in) 45 degree angle, 10"/minute | Propagation Opening Force (grams/in) 45 degree angle, 10"/minute |
|---|---|---|---|---|---|---|---|
| Example 7 | ~3.5 mil 86.5% LDPE1 + 13.5% PB1 (compounded) | ~0.6 mil 57% HDPE2 + 20% HDPE3 + 20% PB2 + 3% PA | 13.31 | 13.38 | 13.80 | 1456 | 602 |
| Example 8 | ~3.5 mil 86.5% LDPE1 + 13.5% PB1 (compounded) | ~.85 mil 50% HDPE3 + 30% LDPE2 + 20% PB2 (compounded) | 19.17 | 18.64 | 18.18 | 1791 | 878 |
| Example 9 | ~3.5 mil 85% LDPE1 + 15% PB1 (compounded) | ~0.6 mil 57% HDPE2 + 20% HDPE3 + 20% PB2 + 3% PA | 13.69 | 12.79 | 14.79 | 1301 | 580 |
| Example 10 | ~3.5 mil 85% LDPE1 + 15% PB1 (compounded) | ~.85 mil 50% HDPE3 + 30% LDPE2 + 20% PB2 (compounded) | 18.16 | 16.25 | 16.99 | 1497 | 788 |
| Example 11 | ~3.5 mil 80% LDPE1 + 20% PB1 (compounded) | ~0.6 mil 57% HDPE2 + 20% HDPE3 + 20% PB2 + 3% PA | 13.72 | 11.39 | 13.98 | 1138 | 479 |
| Example 12 | ~3.5 mil 80% LDPE1 + 20% PB1 (compounded) | ~.85 mil 50% HDPE3 + 30% LDPE2 + 20% PB2 (compounded) | 18.88 | 15.04 | 14.99 | 1176 | 603 |
| Example 13 | ~3.5 mil 75% LDPE1 + 25% PB1 (compounded) | ~0.6 mil 57% HDPE2 + 20% HDPE3 + 20% PB2 + 3% PA | 12.10 | 10.83 | 11.65 | 825 | 377 |
| Example 14 | ~3.5 mil 75% LDPE1 + 25% PB1 (compounded) | ~.85 mil 50% HDPE3 + 30% LDPE2 + 20% PB2 (compounded) | 14.44 | 12.59 | 13.48 | 1090 | 492 |

As shown by Examples 3-14, a first sealant layer comprising low density polyethylene and a first contaminant over a wide weight percent range (e.g., from about 10 weight percent to about 25 weight percent of the first sealant layer) sealed to a second sealant layer comprising polyethylene polymer and a second contaminant produced seals having (1) burst strength indicative of sealing through "contamination" and of seals that remained intact when exposed to pressure differentials and (2) initial opening force and propagation opening force indicative of seals that were peelable and easily opened (e.g., less than 2,500 g/inch). Also, as shown by Examples 3-14, whether low density polyethylene and the first contaminant and/or polyethylene polymer and the second contaminant were compounded did not affect the burst strength, the initial opening force or the propagation opening force. Furthermore, as shown by Examples 3-14, whether or not the second sealant layer comprised a polyethylene polymer comprising one high density polyethylene and a second contaminant or a first high density polyethylene, a second high density polyethylene and a second contaminant did not affect the burst strength, the initial opening force or the propagation opening force. Additionally, as shown by Examples 4, 6, 8, 10, 12 and 14, the second sealant layer comprised low density polyethylene in addition to high density polyethylene and a second contaminant without affecting the burst strength, the initial opening force or the propagation opening force.

In a third example set reported in Table 10, various first sealant layers having the approximate thickness, composition and package contents level ("clean," "minor" or "major") indicated were thermoformed into cups, filled with product and sealed to various second sealant layers that were slit/die cut into lidding film and had the approximate thickness and composition indicated. All seals were contour seals formed at a sealing temperature of 220° C., a sealing pressure of 25 psi and a dwell time of 0.92 seconds. The various burst strengths and initial opening forces were determined and are reported in Table 10.

TABLE 10

| | First Sealant Layer | Second Sealant Layer | Burst Strength Clean (psi) | Burst Strength Minor (psi) | Burst Strength Major (psi) | Initial Opening Force (grams/in) 45 degree angle, 10"/minute | Propagation Opening Force (grams/in) 45 degree angle, 10"/minute |
|---|---|---|---|---|---|---|---|
| Comparative Example 4 | ~2.5 mil 25% PP1 + 25% PP2 + 30% EL1 + 20% CP1 | ~0.4 mil 80% PP3 + 20% EL1 | 24.76 | 19.71 | 9.19 | 1652 | 738 |
| Comparative Example 5 | ~2.5 mil 20% PP1 + 20% PP2 + 40% EL1 + 20% CP1 | ~0.4 mil 80% PP3 + 20% EL1 | 29.07 | 24.16 | 13.39 | 2009 | 793 |
| Comparative Example 6 | ~2 mil 40% PP1 + 40% PP2 + 20% CP1 | ~0.6 mil 57% HDPE2 + 20% HDPE3 + 20% PB2 + 3% PA | 16.61 | 18.35 | 5.49 | 1135 | 669 |
| Comparative Example 7 | ~2.5 mil 100% LDPE1 | ~0.6 mil 57% HDPE2 + 20% HDPE3 + 20% PB2 + 3% PA | 22.90 | 19.67 | 12.47 | 3061 | 1544 |

As shown by Comparative Examples 4 and 5, a first sealant layer comprising a first contaminant (e.g., polypropylene homopolymer (PP1)) but no low density polyethylene sealed to a second to a second sealant layer comprising a second contaminant (e.g., PP3) in an amount of about 80% by weight of the second sealant layer and a polyethylene polymer (e.g., EL1) in an amount about 20% by weight of the second sealant layer produced seals having (1) burst strength indicative of sealing that was not through "contamination" and of a seal that did not remain intact when exposed to pressure differentials (e.g., Comparative Example 4 with a burst strength of 9.19 psi with major level of package contents on the first sealant layer) and (2) initial opening force and propagation opening force indicative of seals that were not necessarily peelable and were not necessarily easily opened (e.g., Comparative Example 5 with initial opening force of 2009 g/inch). Also, as shown by Comparative Example 6, a first sealant layer comprising a first contaminant (e.g., polypropylene homopolymer (PP1)) but no low density polyethylene sealed to a second sealant layer comprising polyethylene polymer and a second contaminant produced seals having burst strength indicative of sealing that was not through "contamination" and of a seal that did not remain intact when exposed to pressure differentials (e.g., Comparative Example 6 with a burst strength of 5.49 psi with major level of package contents on the first sealant layer). Furthermore, polypropylene-based seals (e.g., Comparative Examples 4-6) were observed to have a higher incidence of channel leakers and higher leaker rates. Additionally, as shown by Comparative Example 7, a first sealant layer comprising low density polyethylene but no first contaminant sealed to a second sealant layer comprising polyethylene polymer and a second contaminant produced a seal having an initial opening force indicative of a seal that was not peelable and was not easily opened (similar to Comparative Example 3 described above).

In a fourth example set, the first sealant layer and the second sealant layer of each of Example 15 and Comparative Example 3 had the approximate thickness and composition as shown in Table 11.

TABLE 11

| | First Sealant Layer | Second Sealant Layer |
|---|---|---|
| Example 15 | ~3.5 mil 86.5% LDPE1 + 13.5% PB1 | ~0.6 mil 57% HDPE2 + 20% HDPE3 + 20% PB2 + 3% PA |
| Comparative Example 3 | ~9 mil 100% LDPE1 | ~0.6 mil 57% HDPE2 + 20% HDPE3 + 20% PB2 + 3% PA |

As a first data point, the first sealant layer was thermoformed into cups and sealed to the second sealant layer (slit/die cut into lidding film) at various sealing temperatures and sealing pressures to form a contour seal. The initial opening forces were determined and are reported in Table 12.

TABLE 12

| | Sealing temperature (° C.) | Sealing pressure (psi) | Initial Opening Force (grams/in) 45 degree angle, 10"/minute |
|---|---|---|---|
| Example 15 | 220 | 80 | 1475 |
| Example 15 | 220 | 100 | 1571 |
| Example 15 | 228 | 80 | 1614 |

TABLE 12-continued

| | Sealing temperature (° C.) | Sealing pressure (psi) | Initial Opening Force (grams/in) 45 degree angle, 10"/minute |
|---|---|---|---|
| Comparative Example 3 | 228 | 80 | 2882 |
| Example 15 | 228 | 100 | 1758 |

As shown in Table 12, the presence of a first contaminant in a first sealant layer (e.g., in Example 15) produced a seal having an initial opening force indicative of a seal that was peelable and easily opened over a range of sealing temperatures and sealing pressures, while the absence of a first contaminant in a first sealant layer (e.g., in Comparative Example 3) produced a seal having an initial opening force indicative of a seal that was not peelable and was not easily opened even at one point in the range (i.e., the higher end of the sealing temperature range (e.g., 228° C.) and the lower end of the sealing pressure range (e.g., 80 psi)).

Figure 16:
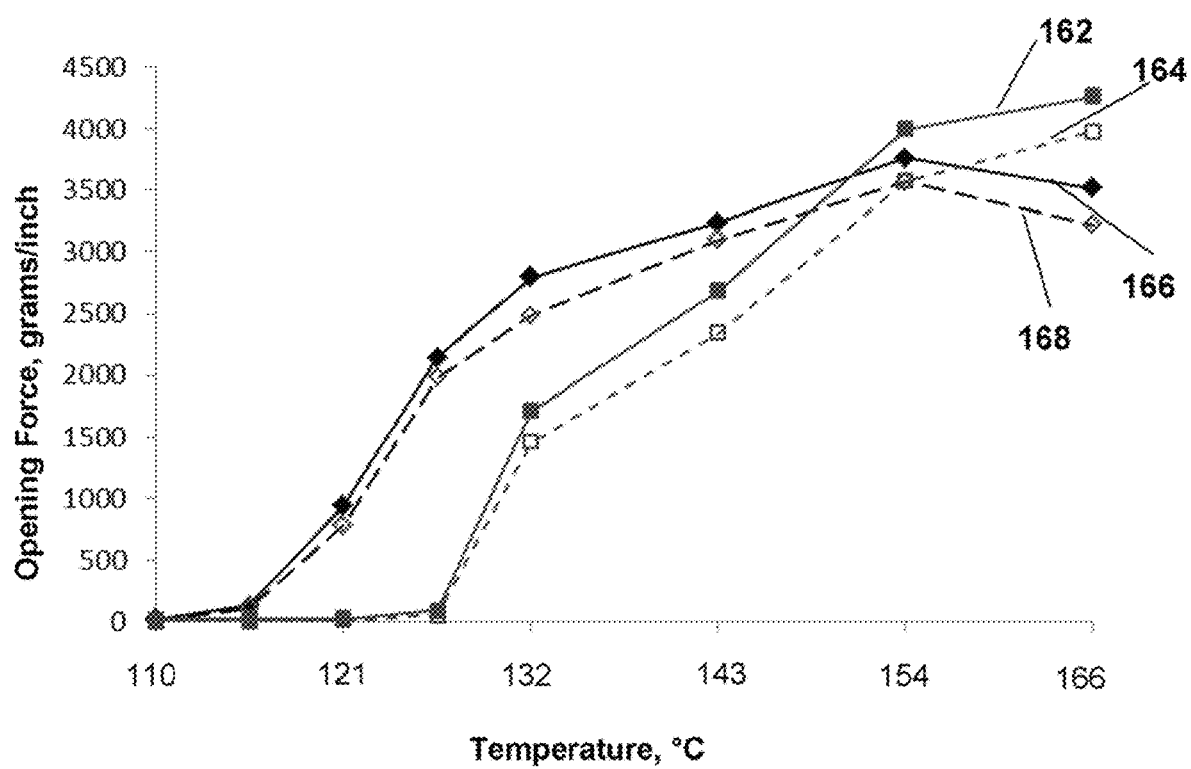
FIG. 16 is a graph showing the measured opening forces of two examples at various sealing temperatures.

As a second data point for Example 15 and Comparative Example 3, the first sealant layer was thermoformed into cups and sealed to the second sealant layer (slit/die cut into lidding film) again at various sealing temperatures, at a sealing pressure of 50 psi and a dwell time of 1.0 second to form a contour seal. FIG. 16 is a graph showing the measured opening forces at the various sealing temperatures. Line 162 of FIG. 16 depicts the initial opening force (in grams/inch at 180 degree angle, 12"/minute crosshead speed) of Comparative Example 3 at various sealing temperatures. Line 164 of FIG. 16 depicts the propagation opening force (in grams/inch at 180 degree angle, 12"/minute crosshead speed) of Comparative Example 3 at various sealing temperatures. Line 166 of FIG. 16 depicts the initial opening force (in grams/inch at 180 degree angle, 12"/minute crosshead speed) of Example 15 at various sealing temperatures. Line 168 of FIG. 16 depicts the propagation opening force (in grams/inch at 180 degree angle, 12"/minute crosshead speed) of Example 15 at various sealing temperatures. As shown in FIG. 16, the presence of a first contaminant in a first sealant layer (e.g., in Example 15) produced a peelable seal at a sealing temperature from about 120° C. to about 130° C. and a sealing pressure about 50 psi. While the absence of a first contaminant in a first sealant layer (e.g., in Comparative Example 3) produced a peelable seal at a sealing temperature from about 130° C. to about 140° C. and a sealing pressure about 50 psi. The seal initiation point for Example 15 was at a lower temperature (e.g., about at least 10° C. lower) than the seal initiation point for Comparative Example 3. This may result in manufacturing efficiencies and cost-savings.

In a fifth example set, the first sealant layer and the second sealant layer of each of Example 16 and Comparative Example 3 had the approximate thickness and composition as shown in Table 13.

TABLE 13

| | First Sealant Layer | Second Sealant Layer |
|---|---|---|
| Example 16 | ~3.5 mil 85% LDPE1 + 15% PB1 (compounded) | ~0.6 mil 57% HDPE2 + 20% HDPE3 + 20% PB2 + 3% PA |
| Comparative Example 3 | ~9 mil 100% LDPE1 | ~0.6 mil 57% HDPE2 + 20% HDPE3 + 20% PB2 + 3% PA |

As a first data point, the first sealant layer was thermoformed into cups and sealed to the second sealant layer (slit/die cut into lidding film) at various temperatures and pressures to form a contour seal. The initial opening forces and the propagation opening forces were determined and are reported in Table 14.

TABLE 14

| | Sealing temperature (° C.) | Sealing pressure (psi) | Initial Opening Force (grams/in) 45 degree angle, 10"/minute | Propagation Opening Force (grams/in) 45 degree angle, 10"/minute |
|---|---|---|---|---|
| Example 16 | 210 | 87 | 1253 | 662 |
| Comparative Example 3 | 210 | 87 | 2281 | 1512 |
| Example 16 | 210 | 43.5 | 940 | 501 |
| Comparative Example 3 | 210 | 43.5 | 1895 | 1124 |
| Example 16 | 218 | 50.8 | 961 | 533 |
| Comparative Example 3 | 218 | 50.8 | 2059 | 1174 |
| Example 16 | 225 | 87 | 1512 | 779 |
| Comparative Example 3 | 225 | 87 | 2782 | 1412 |
| Example 16 | 225 | 43.5 | 1019 | 547 |
| Comparative Example 3 | 225 | 43.5 | 2169 | 1111 |

As shown in Table 14, the presence of a first contaminant in the first sealant layer (e.g., in Example 16) produced a seal having initial opening force and propagation opening force indicative of seals that were peelable and easily opened (e.g., less than 2,500 g/inch) across a wider range of sealing temperatures and sealing pressures.

As a second data point for Example 16 and Comparative Example 3, the first sealant layer was thermoformed into cups, filled with product (e.g., pudding) and sealed to the second sealant layer slit into lidding film. All seals were contour seals created at a sealing temperature from about 220° C. to about 230° C. and a sealing pressure from about 20 psi to about 25 psi. The finished packages were presented to 48 seniors (with approximate ages 65 and above), 48 adults (with approximate ages 20 to 50) and 48 children (with approximate ages 6 to 9). These various populations were asked several questions regarding the finished packages. The questions and answers to the questions are reported in Table 15.

TABLE 15

| | | Positive Response | | Neutral Response Neither | Negative Response | |
|---|---|---|---|---|---|---|
| All things considered, which of the following best describes how easy or difficult it was to open the package of ready-to-eat pudding? | | Extremely Easy | Somewhat Easy | Neither Easy or Difficult | Somewhat Difficult | Extremely Difficult |
| seniors | Example 16 | 35% | 40% | 19% | 6% | 0% |
| | Comparative Example 3 | 0% | 0% | 8% | 48% | 44% |
| adults | Example 16 | 52% | 38% | 8% | 2% | 0% |
| | Comparative Example 3 | 0% | 6% | 17% | 60% | 17% |
| children | Example 16 | 83% | | 13% | | 4% |
| | Comparative Example 3 | 6% | | 9% | | 85% |
| aggregate | Example 16 | 82.6% | | 13.2% | | 4.2% |
| | Comparative Example 3 | 4.2% | | 11.8% | | 84.0% |

| | | Strongly Agree | Agree | Neither Agree or Disagree | Disagree | Strongly Disagree |
|---|---|---|---|---|---|---|
| The lid tore cleanly away from the base. | | | | | | |
| seniors | Example 16 | 71% | 17% | 4% | 6% | 2% |
| | Comparative Example 3 | 29% | 17% | 10% | 17% | 27% |
| adults | Example 16 | 79% | 11% | 0% | 8% | 2% |
| | Comparative Example 3 | 42% | 17% | 10% | 17% | 14% |
| aggregate | Example 16 | 88.5% | | 2.1% | | 9.4% |
| | Comparative Example 3 | 52.1% | | 10.4% | | 37.5% |

| | | Strongly Agree | Agree | Neither Agree or Disagree | Disagree | Strongly Disagree |
|---|---|---|---|---|---|---|
| It was easy to get the lid to start to peel open. | | | | | | |
| seniors | Example 16 | 63% | 17% | 8% | 8% | 4% |
| | Comparative Example 3 | 8% | 10% | 15% | 15% | 52% |

TABLE 15-continued

|  |  | Positive Response | | Neutral Response Neither | Negative Response | |
|---|---|---|---|---|---|---|
| adults | Example 16 | 57% | 31% | 6% | 6% | 0% |
|  | Comparative Example 3 | 8% | 13% | 8% | 40% | 31% |
| aggregate | Example 16 | 83.3% | | 7.3% | 9.4% | |
|  | Comparative Example 3 | 19.8% | | 11.5% | 68.8% | |

| Once started, it was easy to peel off the lid. |  | Strongly Agree | Agree | Neither Agree or Disagree | Disagree | Strongly Disagree |
|---|---|---|---|---|---|---|
| seniors | Example 16 | 65% | 23% | 12% | 0% | 0% |
|  | Comparative Example 3 | 2% | 11% | 23% | 33% | 31% |
| adults | Example 16 | 67% | 29% | 4% | 0% | 0% |
|  | Comparative Example 3 | 2% | 23% | 19% | 42% | 14% |
| aggregate | Example 16 | 91.7% | | 8.3% | 0.0% | |
|  | Comparative Example 3 | 18.8% | | 20.8% | 60.4% | |

| This package is easier to open than other ready-to-eat pudding. |  | Strongly Agree | Agree | Neither Agree or Disagree | Disagree | Strongly Disagree |
|---|---|---|---|---|---|---|
| seniors | Example 16 | 42% | 29% | 25% | 4% | 0% |
|  | Comparative Example 3 | 0% | 4% | 8% | 42% | 46% |
| adults | Example 16 | 44% | 27% | 21% | 8% | 0% |
|  | Comparative Example 3 | 0% | 2% | 23% | 35% | 40% |
| aggregate | Example 16 | 70.8% | | 22.9% | 6.3% | |
|  | Comparative Example 3 | 3.1% | | 15.6% | 81.3% | |

| The way this lid peels makes me more interested in purchasing ready-to-eat pudding. |  | Strongly Agree | Agree | Neither Agree or Disagree | Disagree | Strongly Disagree |
|---|---|---|---|---|---|---|
| seniors | Example 16 | 27% | 27% | 33% | 13% | 0% |
|  | Comparative Example 3 | 0% | 15% | 23% | 33% | 29% |
| adults | Example 16 | 23% | 35% | 27% | 11% | 4% |
|  | Comparative Example 3 | 2% | 11% | 35% | 33% | 19% |
| aggregate | Example 16 | 56.3% | | 30.2% | 13.5% | |
|  | Comparative Example 3 | 13.5% | | 29.2% | 57.3% | |

As shown in Table 15, the ease of opening and "peelability" of the package of Example 16 had a more favorable impression (including but not limited to higher purchase intent) and more readily met long-felt needs of the tested populations than that of Comparative Example 3.

The above description, examples and embodiments disclosed are illustrative only and should not be interpreted as limiting. The present invention includes the description, examples and embodiments disclosed; but it is not limited to such description, examples or embodiments. Modifications and other embodiments will be apparent to a person of ordinary skill in the art, and all such modifications and other embodiments are intended and deemed to be within the scope of the present invention as defined by the claims.

What is claimed is:
1. A package comprising:
a first film and a second film, wherein the first film comprises an interior layer comprising a first sealant layer and the second film comprises an interior layer comprising a second sealant layer,
the first sealant layer comprising low density polyethylene in an amount from about 70% to about 95% by weight of the first sealant layer and a first contaminant in an amount from about 5% to about 30% by weight of the first sealant layer, wherein the first contaminant comprises propylene/ethylene copolymer with ethylene content from about 0.1 mol % to about 5 mol %, polypropylene homopolymer, butene/ethylene copolymer or polybutene homopolymer; and
the second sealant layer comprising polyethylene polymer in an amount from about 70% to about 90% by weight of the second sealant layer, wherein the polyethylene polymer comprises high density polyethylene, low density polyethylene, ethylene alpha-olefin copolymer or blends of such, and a second contaminant in an amount from about 10% to about 30% by weight of the second sealant layer, wherein the second contaminant comprises propylene/ethylene copolymer with ethylene content from about 0.1 mol % to about 5 mol %, polypropylene homopolymer, butene/ethylene copolymer or polybutene homopolymer, and wherein the first sealant layer and the second sealant layer are sealed together to form a peelable seal.

2. The package of claim 1 wherein one of either the first film or the second film is a sheet thermoformed into a cup and the other of the first film or the second film is a film that is slit or die cut into a lidding film.

3. The package of claim 1 wherein the peelable seal has a burst strength greater than about 7.4 psi in accordance with ASTM F2054 and an initial opening force of less than about 2,500 g/inch in accordance with ASTM F88 or with ASTM F88 as modified for a 45-degree tray peel test.

4. The package of claim 1 wherein the peelable seal is a contour seal.

5. The package of claim 1 wherein the peelable seal has a burst strength between 10 psi and 50 psi in accordance with ASTM F2054 and an initial opening force between 0 g/inch and 2,000 g/inch in accordance with ASTM F88 or with ASTM F88 as modified for a 45-degree tray peel test.

6. The package of claim 1 wherein the first sealant layer and the second sealant layer are adapted to be sealed together (1) at a sealing temperature from about 210° C. to about 225° C. and a sealing pressure of from about 43 psi to about 87 psi or (2) at a sealing temperature from about 120° C. to about 130° C. and a sealing pressure about 50 psi or (3) at a sealing temperature from about 220° C. to about 230° C. and a sealing pressure from about 20 psi to about 25 psi.

7. The package of claim 1 wherein the first contaminant is in an amount from 10% to 25% by weight of the first sealant layer.

8. The package of claim 1 wherein the second contaminant is in an amount from 15% to 25° A) by weight of the second sealant layer.

9. The package of claim 1 wherein the polyethylene polymer of the second sealant layer comprises high density polyethylene.

10. The package of claim 1 wherein the polyethylene polymer of the second sealant layer comprises a blend of a first high density polyethylene and a second high density polyethylene.

11. The package of claim 1 wherein the polyethylene polymer of the second sealant layer comprises a blend of high density polyethylene and low density polyethylene.

12. The package of claim 1 wherein the polyethylene polymer of the second sealant layer comprises low density polyethylene.

13. The package of claim 1 wherein the polyethylene polymer of the second sealant layer comprises a blend of low density polyethylene and ethylene alpha-olefin copolymer.

14. The package of claim 1 wherein the package is an aseptic package.

15. An aseptic package comprising
a first film comprising a first sealant layer comprising low density polyethylene in an amount from about 75% to about 90% by weight of the first sealant layer and a random butene-1/ethylene copolymer in an amount from about 10% to about 25% by weight of the first sealant layer; and
a second film comprising a second sealant layer comprising a first high density polyethylene in an amount from about 50% to about 65% by weight of the second sealant layer, a second high density polyethylene in an amount from about 15% to about 25% by weight of the second sealant layer and a polybutene homopolymer in an amount of from about 15% to about 25% by weight of the second sealant layer, and
wherein the first sealant layer and the second sealant layer are sealed together.

16. The package of claim 15 wherein the first film is a sheet thermoformed into a cup and the second film is a film that is slit or die cut into a lidding film.

17. The package of claim 15 wherein the first sealant layer and the second sealant layer are adapted to be sealed together to form a peelable seal having a burst strength between 10 psi and 50 psi in accordance with ASTM F2054 and an initial opening force between 0 g/inch and 2,000 g/inch in accordance with ASTM F88 or with ASTM F88 as modified for a 45-degree tray peel test.

18. The package of claim 17 wherein the peelable seal is a contour seal.

19. The package of claim 15 wherein the first sealant layer and the second sealant layer are adapted to be sealed together (1) at a sealing temperature from about 210° C. to about 225° C. and a sealing pressure of from about 43 psi to about 87 psi or (2) at a sealing temperature from about 120° C. to about 130° C. and a sealing pressure about 50 psi or (3) at a sealing temperature from about 220° C. to about 230° C. and a sealing pressure from about 20 psi to about 25 psi.

* * * * *

UNITED STATES PATENT AND TRADEMARK OFFICE
CERTIFICATE OF CORRECTION

PATENT NO. : 10,857,754 B2
APPLICATION NO. : 16/562019
DATED : December 8, 2020
INVENTOR(S) : Kevin D. Glaser and Sam E. Wuest Page 1 of 1

It is certified that error appears in the above-identified patent and that said Letters Patent is hereby corrected as shown below:

In the Specification

Column 3, Line 7, replace "is an" with -- in an --

Column 5, Line 64, replace "g/cma" with -- g/cm3 --

Column 26, table 15, replace "Neutral Response Neither" with -- Neutral Response --

In the Claims

Column 29, Line 30, replace "25°A)" with -- 25% --

Signed and Sealed this
Eighth Day of February, 2022

Drew Hirshfeld
*Performing the Functions and Duties of the*
*Under Secretary of Commerce for Intellectual Property and*
*Director of the United States Patent and Trademark Office*